United States Patent
Kronfeld et al.

(12) 
(10) Patent No.: US 6,577,947 B1
(45) Date of Patent: Jun. 10, 2003

(54) METHOD AND APPARATUS FOR IDENTIFICATION OF HAZARDS ALONG AN INTENDED TRAVEL ROUTE

(75) Inventors: Kevin M. Kronfeld, Cedar Rapids, IA (US); Mary Beth Lapis, Swisher, IA (US); Karen L. Walling, Cedar Rapids, IA (US); Mathew S. Chackalackal, Davenport, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 10/087,243

(22) Filed: Mar. 1, 2002

(51) Int. Cl.[7] .................................................. G06F 7/00
(52) U.S. Cl. ........................ 701/202; 701/208; 701/301
(58) Field of Search .............................. 701/1, 14, 200, 701/202, 208, 300, 301

(56) References Cited

U.S. PATENT DOCUMENTS 6,289,277 B1 * 9/2001 Feyereisen et al. ......... 701/202
6,317,690 B1 * 11/2001 Gia ............................. 701/301
6,421,603 B1 * 7/2002 Pratt et al. .................. 701/206

* cited by examiner

*Primary Examiner*—William A. Cuchlinski, Jr.
*Assistant Examiner*—Edward Pipala
(74) *Attorney, Agent, or Firm*—Nathan O. Jensen; Kyle Eppele

(57) ABSTRACT

Targets proximate to a travel route plan were evaluated to determine hazardousness. Projected geometric representation of a vehicle determines intrusion of hazardous targets along travel route plan. Geometric representation of hazardous targets projected along motion vector to determine intrusion upon travel route plan. Intrusion assessment presented on user display.

20 Claims, 14 Drawing Sheets

METHOD AND APPARATUS FOR IDENTIFICATION OF HAZARDS ALONG AN INTENDED TRAVEL ROUTE

The U.S. Government has a paid-up license in this invention and the right in limited circumstances to require the patent owner to license others on reasonable terms as provided for by the terms of the contract number NCC-1-355 awarded by NASA.

FIELD OF THE INVENTION

This invention relates generally to travel route planning; and specifically to hazard avoidance.

BACKGROUND OF THE INVENTION

Travel route planning is critically important to maintaining safe passage in a non-constrained mode of travel. Non-constrained travel modes typically comprise any mode of travel that is not confined to a specific route, i.e. a road. Hence, air travel, marine navigation and even space travel comprise some example modes of non-constrained travel. Aquatic submarines are also non-constrained vehicles. In aircraft travel, flighty safety hinges on proper flight planning. Flight plans are a required part of flight procedures as mandated by government agencies. In addition, flight planning is an ongoing activity during most flights due to changing weather conditions. This is true for marine navigation as well. In space, flight planning defines each leg of a flight from lift-off to orbit to re-entry and to landing.

The travel route planning practice has evolved over time. This evolution has fundamentally been driven by a simple goal: arriving safely at an intended destination. One aspect of travel route planning, which is especially true in non-constrained modes of travel, is that of determining the location of hazardous objects and avoiding them along the way to the final destination. Determining where hazardous objects are in time to avoid them has always been a central challenge of travel route planning. Initially, this was accomplished visually; pilots or mariners would travel along their intended route and avoid an obstacle or other hazard in due course.

These visual methods were normally compromised by poor visibility and the general inability to determine if an object was hazardous at a distance. Travelers would often find themselves in a hazardous storm before they realized its dangerous nature. As technology became more enhanced, methods such as radio reports, radar detection, and satellite systems have become extended sensors that can be used to warn pilots or mariners of hazardous objects along their intended travel route. With this type of technology, travel route planning evolved to a new level of proficiency. Flight plans and other intended travel routes could now be based on knowledge of obstacles hundreds of miles ahead of the craft.

Although the enhancements of modern technology greatly improved travel route planning and the ability to identify hazardous targets at great distances, the general operational schema of exploiting this information has remained difficult and tedious. Some of the remaining challenges to travel route planning include, but are not necessarily limited to estimating the impact of moving hazardous objects, simplifying travel route definition so as to simplify the route planning process, and optimizing travel route plans to decrease travel time and/or conserve fuel.

Now that sensor and communication technology has brought together the necessary information to construct a static travel route plan over great distances, what is needed is a way to quickly derive the best travel route plan and rapidly update it as conditions change.

SUMMARY OF THE INVENTION

The present invention comprises a method and an apparatus for identifying hazards along a travel route plan and then providing the results of the assessment to an output port. In some cases, the output port may be coupled to a display adapter for presenting the hazard assessment to a human user. The human user may be a pilot, another member of the flight crew or any other user who may have a need for an assessment of hazardous conditions along a travel route plan. Relying on a wide variety of sensory inputs, the method of the present invention comprises a first step of receiving a target message that defines the position of a target. In some embodiments, the method provides for a first filtering step that identifies targets that may lie along the travel route plan within a predefined buffer zone. Once a target has been identified as being within this buffer zone, it is evaluated to determine if the target may be hazardous to the safety of a vehicle. The buffer zone may be received either from a human user or from a predefined zone stored in some computer readable media.

According to one illustrative method of the present invention, determining the hazardousness of a target may comprise a simple step of comparing the target to predefined hazardous condition criteria. In one example, a target may be identified as being hazardous if it meets the criteria of being a thunderstorm. This, though, is just one example of possible hazard criteria that may be applicable to the method of the present invention and should not constrain the scope of the invention. Other illustrative hazard comparisons may comprise other hazardous weather, terrestrial fixtures and high-elevation terrain. According to one illustrative method of the present invention, targets are tracked using target descriptors. Hence, target attribute data may be retrieved from a target descriptor and used as the basis for the hazard evaluation.

Once a target has been identified as being hazardous, it is marked as such. For a target that has been marked as hazardous, the method of the present invention suggests the creation of a geometric representation of the hazardous target. On a periodic basis, the method of the present invention requires an assessment of the intrusiveness of the geometric representation of the hazardous target into a geometric representation of the vehicle projected along the travel route plan of the vehicle in time or distance. According to this illustrative method, the assessment of intrusiveness may then be presented. This presentation may be made to an output port or presented to a human user. It should be noted that the geometric representation of either the vehicle or a target may either be generated locally onboard the vehicle or received from off-vehicle sources.

According to one illustrative embodiment of a method according to the teachings of the present invention, assessing the intrusiveness of the geometric representation of a hazardous target into the geometric representation of the vehicle may require partitioning the required projection into a finite number of increments. Typically, the amount of projection required is expressed in either time or distance of travel. For each successive increment, the geometric representation of the vehicle is projected to the end of the increment. If this projected geometric representation of the vehicle is found to be coincident with the geometric representation of a hazardous target, the method of the present invention provides for setting a hazard-warning-flag for that particular segment of the travel route plan corresponding to the increment.

Presentation of the assessment of intrusiveness may be accomplished in a similar manner. According to this illustrative method, the travel route plan of a vehicle may be partitioned into a plurality of segments. Each of the segments may then be displayed to a user. For each segment that has a corresponding hazard-warning-flag set active, the segment displayed may be highlighted to indicate that that segment of the travel route plan may be associated with a hazardous target. The method of assessing intrusiveness where only the vehicle is projected is typically referred to as a static target method.

Highlighting the particular segment comprises one aspect of the illustrative method taught here. Such highlighting may be accomplished by painting a line parallel to and offset from the segment that needs to be highlighted. Drawing two parallel lines that straddle the segment to be highlighted might also accomplish highlighting. In yet another alternative highlighting method taught by the present invention, displayed segments may be flashed or drawn in an alternative color to ensure that a user notices the hazardous nature of a particular segment of the flight plan.

According to an alternative illustration of the method of the present invention, a target message that is received from various sensory devices may comprise a motion vector for a particular target. This motion vector may be extracted from the target message and used to project the geometric representation of a hazardous target in time or distance. According to the teachings of the method of the present invention, this projected geometric representation of a hazardous target may be used in conjunction with the projected geometric representation of the vehicle to determine intrusiveness. This method is typically referred to as dynamic intrusiveness assessment. Once the dynamic intrusiveness has been assessed, it may then be presented to an output port or to a human user in a manner akin to that already described for a static target intrusiveness assessment.

Dynamic intrusiveness may be assessed by first partitioning the required time or distance of projection into a finite number of increments. For each increment, the geometric representation of the vehicle may be projected along its travel route plan and the geometric representation of the hazardous target may be projected along its motion vector. For every segment, a hazard-warning-flag may be set to indicate coincidence of these two projected geometric representations.

The method of the present invention may receive target messages from a wide variety of sources. One such source may be an onboard radar system. According to this illustrative method, a radar image may be received from such an onboard radar system and used to identify targets. Each of these targets may result in the creation of a target descriptor. According to this illustrative embodiment, target descriptors may define the position of a target either relative to the vehicle or relative to a global coordinate system.

In one alternative embodiment of a method according to the present invention, target attributes may be either created or received and then stored in a target descriptor. Such attributes may include, but are not necessarily limited to speed and direction of travel (i.e. motion vector) and size of the object. For the case where a target descriptor is created in response to a target identified by onboard sensors, additional processing onboard the vehicle may generate such attributes data. In the case were a target descriptor is created in response to a target message received from an off-vehicle target tracking system, such attribute data may comprise the target message and is typically extracted from the message and then stored in the target descriptor.

The method of the present invention also allows for the reception of target messages from off-vehicle tracking systems. Such messages may also comprise position information that may define the position of a target either relative to the vehicle or relative to a global coordinate system.

In a general illustrative embodiment of a method according to the present invention, a first target message may result in a target descriptor. Other target descriptors may be generated in response to other target messages received from other sensory devices, either onboard or off-vehicle sourced. The first target descriptor may then be correlated with other target descriptors in order to identify which target descriptors may represent the same target. When these are identified, all attribute data may be combined to form a union of all attribute data pertinent to a particular target and stored in one target descriptor comprising a fusion of all of the attribute data.

In some embodiments of the present method, the geometric representations of targets or a vehicle may either be generated locally onboard the vehicle or they may be received from external sources. The geometric representation, according to one illustrative method of the present invention, may comprise a point in two or three-dimensional space. The geometric representation may alternately comprise a line defined by two end points. The geometric representation may also be defined by three or more points that collectively define the perimeter of a portion of a plane. Targets or a vehicle may likewise be represented by geometry comprising an ellipse. In this case, an ellipse may be specified according to two focal points with at least one point that controls the focal length of one or both focal points. An ellipse of this type may be used to define a portion of a plane lying within its perimeter in either two or three-dimensional space.

According to some illustrative methods of the present invention, the geometric representation of a target or a vehicle may comprise a three-dimensional volume. According to one example, a three-dimensional volume may be defined by specifying four or more points to defined a three-dimensional volume having linear boundaries. Abstract shapes may be represented by defining two or more points coincidence with the ends of a Bézier curve. Additional points may be used to defined curvature of the Bézier curve as it approaches one of its end points. The Bézier curve may also be revolved around a straight axis defined by its two end points through a specified sweep angle in order to define an abstractly shaped three-dimensional volume.

The present invention also comprises an apparatus that embodies the method of the present invention. According to one such illustrative embodiment, a travel hazard assessment device may comprise an input port for receiving target messages and flight plans. A buffer zone manager, that also comprises the travel hazard assessment device, may determine if target messages correspond to targets that lie within a predefined buffer zone along a travel route plan. According to this example of embodiment of the present invention, a travel hazard assessment device may also comprise a criticality manager that determines which targets within the buffer zone constitute hazards.

According to this one example embodiment of a travel hazard assessment device, the target shape manager comprising an apparatus that creates or receives geometric representations for a target once that target is marked as hazardous. The invention may further comprise an intrusion detector that periodically determines if the geometric representation of the hazardous target intrudes upon the travel route plan received by means of the input port. A display unit also comprises the invention and is used to display segments of a travel route plan to a human user. Particular segments along the travel route plan may be highlighted as an indication that hazardous targets may be proximate to the planned route of the vehicle.

In one alternative embodiment of a travel route hazard assessment device, the invention may comprise a processor coupled to working and program memory that also comprise the invention. The travel route hazard assessment device may also comprise a display adapter coupled to the processor. The display adapters typically capable of driving a display device and is ordinarily controlled by directives generated by the processor under program control.

In this alternative embodiment of a travel route hazard assessment device, a travel route hazard assessment instruction sequence is stored in program memory. The travel route hazard assessment instruction sequence minimally may cause the processor to receive a target message that minimally defines the position of a target. In this example of embodiment, the processor will typically receive the target message from an input port that also comprises the invention.

According to this example of embodiment, the travel route hazard assessment instruction sequence will cause the processor to store the travel route plan in working memory. The processor typically generates a geometric representation of the vehicle and stores this in the working memory. For targets that are hazardous and that lie within the buffer zone along a travel route plan stored in the working memory, the processor will create or receive a geometric representation of the target. The processor may also periodically assess if the geometric representation of the vehicle intrudes upon by the geometric representation of a hazardous target. The travel route hazard assessment instruction sequence typically causes the processor to present the results of this assessment.

In order to accomplish intrusion assessment, the travel route hazard assessment device of the present invention may further comprise an intrusion assessment instruction sequence stored in the program memory. The processor may execute this instruction sequence that will minimally cause the processor to retrieve from the working memory the minimum amount of projection in time or distance that must be performed in the assessment. This time or distance may then be partitioned into a finite number of increments. For each increment, the processor may project the geometric representation of the vehicle along the travel route plan stored in working memory. The processor will also set a flag in working memory for the segment of the travel route plan corresponding to the increment if the projected representation of the vehicle is at all coincidence with the geometric representation of a hazardous target.

In one illustrative embodiment of the travel route hazard assessment device, the invention comprises a presentation instruction sequence also stored in program memory. The processor may call the presentation instruction sequence to display the results of the intrusion assessment created by the intrusion assessment instruction sequence. The presentation instruction sequence may minimally cause the processor to partition the travel route plan stored in working memory into a plurality of segments. In each segment of the flight plan, the processor will typically send paint commands to the display adapter. The processor will also typically retrieve a hazard-warning-flag from the working memory that corresponds to a particular segment. If that flag is active, the processor will send a highlighting command to the display adapter for that ,particular segment.

The presentation instruction sequence may dispatch various highlighting commands to the display adapter. According to one example embodiment, the processor may send a parallel line command to cause the display adapter to paint a line parallel to and offset from the segment to be highlighted. In yet another example embodiment, the processor may dispatch two parallel line commands causing the display adapter to paint two parallel lines that straddle the segment to be highlighted. In yet another illustrative embodiment of the present invention, the highlighting command may comprise a flash command that causes the display adapter to flash the segment to be highlighted. The present invention may also comprise the use color change command for highlighting a particular segment of a flight plan.

In one example embodiment of the present invention, as already introduced supra, the processor may only conduct a static target evaluation. The travel route hazard assessment instruction sequence may further cause the processor to determine a motion vector for a target marked as hazardous. In this case the travel route hazard assessment instruction sequence may also cause the processor to periodically determine the intrusiveness of a hazardous target by projecting the geometric representation of the target stored in working memory along a motion vector and by projecting the geometric representation of the vehicle stored in working memory along the travel route plan is also stored in working memory. These projections may be accomplished according either to time or distance.

In this illustrative embodiment of the present invention, the processor may execute a dynamic intrusion instruction sequence stored in program memory and further comprising the invention. Accordingly, the dynamic intrusion instruction sequence may retrieve a minimum projection time or distance from the working memory. This time or distance may be partitioned into a finite number of increments. According to this illustrative embodiment, the processor may project the geometric representation of a target along the target's motion vector to the end of an increment. This may be compared to the projection of the geometric representation of a vehicle along the travel route plan stored in working memory. In the event that the two geometric representations overlap, a flag may be set in working memory for the segment of the travel route plan corresponding to the increment where the overlap occurs. A dynamic intrusion presentation instruction sequence may also comprise the invention and is typically stored in the program memory. This presentation instruction sequence is analogous to its static counterpart. This presentation instruction sequence may be used to present the results of such a dynamic intrusiveness assessment in some embodiments of the present invention.

In one typical embodiment of the present invention, the travel route hazard assessment device may receive target data from a wide variety of sensors. Target data from both onboard and off-vehicle sensors may be received. In one embodiment, the travel route hazard assessment device may further comprise a, radar target extraction instruction sequence that is stored in program memory. This instruction sequence may cause the processor to perceive an image from an onboard radar system and to identify targets comprising the image. For each target identified, the processor may typically create an onboard-sourced target descriptor that minimally defines the position of a target either relative to the vehicle or relative to a global coordinate system. The processor typically stores this descriptor in working memory In those embodiments that comprise a radar target extraction instruction sequence, this instruction sequence ray further cause the processor to create target attributes for each identify target. These target attributes may then be stored in the working memory. Typically, the target descriptor is retrieved from working memory and augmented with the attributes. The augmented descriptor may then be stored in working memory.

According to one embodiment of the present invention, the travel route hazard assessment instruction sequence may further cause the processor to execute general target processing instruction sequence that further comprises the invention and is stored in program memory. This instruction sequence may cause the processor to receive a target message from a target tracking system. This target message minimally defines the position of a target that the processor uses to create a target descriptor that defines the position of the target relative to the vehicle or relative to a global coordinate system. The general target processing instruction sequence may also cause the processor to extract target attribute data from the target message and to store this in the target descriptor. In some embodiments, the general target processing instruction sequence also causes the processor to extract a motion vector form the target message and to store this in the target descriptor.

In yet another alternative embodiment of the present invention, the travel route hazard assessment device may further comprises a weather target receiver instruction sequence stored in program memory. This weather target receiver instruction sequence typically causes the processor to receive a weather cell report and to create a target descriptor from the report that defines the position of the target either relative to the vehicle or relative to a global coordinate system. This weather-sourced target descriptor may then be stored in working memory. This same instruction sequence may also extract-weather cell attributes from the weather cell report and store these in the target descriptor.

According to one example embodiment of a travel route hazard assessment device, a buffer zone scan instruction sequence further comprises the device stored in program memory. The buffer zone scan instruction sequence causes the processor to accept a buffer zone definition from a user or to retrieve a buffer zone definition from working memory or other computer readable media. This buffer zone definition may be used to determine the extent of a buffer zone along the travel route plan stored in memory. Target descriptors lying outside of the buffer zone may be marked as "no-process". This precludes the processor from performing an assessment of intrusiveness for those targets.

The travel route hazard assessment device of the present invention may further comprise a hazard identification instruction sequence stored in the program memory. This instruction sequence typically causes the processor to retrieve a target descriptor from working memory and extract from the target descriptor a first attribute. This first attribute may then be compared against a list of a hazard types. If the first attribute matches an entry in the list and hazard types, the hazard identification instruction sequence typically causes the processor to set to a hazard by comprising the corresponding target descriptor stored in the working memory. According to one embodiment of the present invention, the hazard flag may be sent by the processor if the first attribute indicates that the target is hazardous weather. In yet another illustrative embodiment, the hazard flag may be sent by the processor if the first attribute matches a hazardous terrestrial fixture category.

Alternately, the hazard flag may be set active in the first attribute indicates that the target corresponds to high altitude terrain. These example hazard comparisons are not intended to limit the scope of the present invention.

The travel route hazard assessment device of the present invention may further comprise a geometric representation instruction sequence that is stored in program memory and causes the processor to represent a target as a point in three-dimensional space. This is typically carried by the target descriptor stored in working memory. In yet another alternative example embodiment, the processor may represent a target as a lying comprising to endpoints. These, too, are stored in working memory. The geometric representation instruction sequence they also cause the processor to store three points representative of a portion of a plane. These points are also stored in the target descriptor corresponding to the target and stored in working memory. A target may also be represented geometrically by an ellipse. In this case, the processor is causes to store in the target descriptor corresponding to the target to points to define the focal points of an ellipse and at least one control point that controls the focal length of either one or both of the focal points.

The geometric representation instruction sequence may also cause the processor to define a target in terms of a three-dimensional volume. In one alternative embodiment of the present invention, the processor may store for points representative three-dimensional volume having linear boundaries in a target descriptor corresponding to the target and stored in working memory. In yet another alternative embodiment of this invention, the geometric representation instruction sequence may cause the processor to define the extents of a target using a Bézier curve defined by two and points and at least one points to control the curvature of the, Bézier curve present approaches one of the endpoints. An irregularly shaped volume may be defined by causing the Bézier curve to sweep around a straight access defined by its two and points.

The present invention further comprises a method for aggregating target messages. According to this method, target messages may be received from various sources either on or off the vehicle. The messages are first received and target descriptors corresponding to each message comprising position and attribute data carried by the target messages are created. The plurality of target descriptors may then be correlated in order to identify a set of target descriptors that represent the same target. The attribute data from each target descriptor in the identified set may then be aggregated into a single target descriptor.

This method is also embodied in a target aggregator that also comprises the present invention. A target aggregator according to the teachings of the present invention comprises an input port that receives target messages. The target aggregator may also comprise an output port for transmitting fused target descriptors. The processor, program memory and working memory also comprise the target aggregator. The target aggregator may comprise an aggregator instruction sequence stored in the program memory and when executed by the processor causes the processor to receive a plurality of target messages from the input port. The processor may then extract position and attribute data from the plurality of target messages and may create a plurality of target descriptors in working memory comprising this data. Accordingly, the processor may correlate the plurality of target descriptors in order to identify a set of target descriptors that represent the same target. From this set, the processor will collect attribute data in order to create and aggregated target descriptor that comprises a union of all attribute data comprising the target descriptors in the identified set. The aggregated target descriptor may then be conveyed to the output port by the processor.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

The present invention comprises an apparatus and method for target identification and hazard assessment. The method of the present invention provides for identification of hazardous targets along an intended travel route; referred to as a travel route plan. Once targets are identified as hazardous, they may be correlated against the travel route plan of a vehicle. The correlation may be output to other devices, or presented to a pilot, mariner of other crewmember responsible for navigating a non-constrained vehicle through two or three-dimensional space. The present invention also comprises an apparatus that embodies the method taught here.

Figure 1:
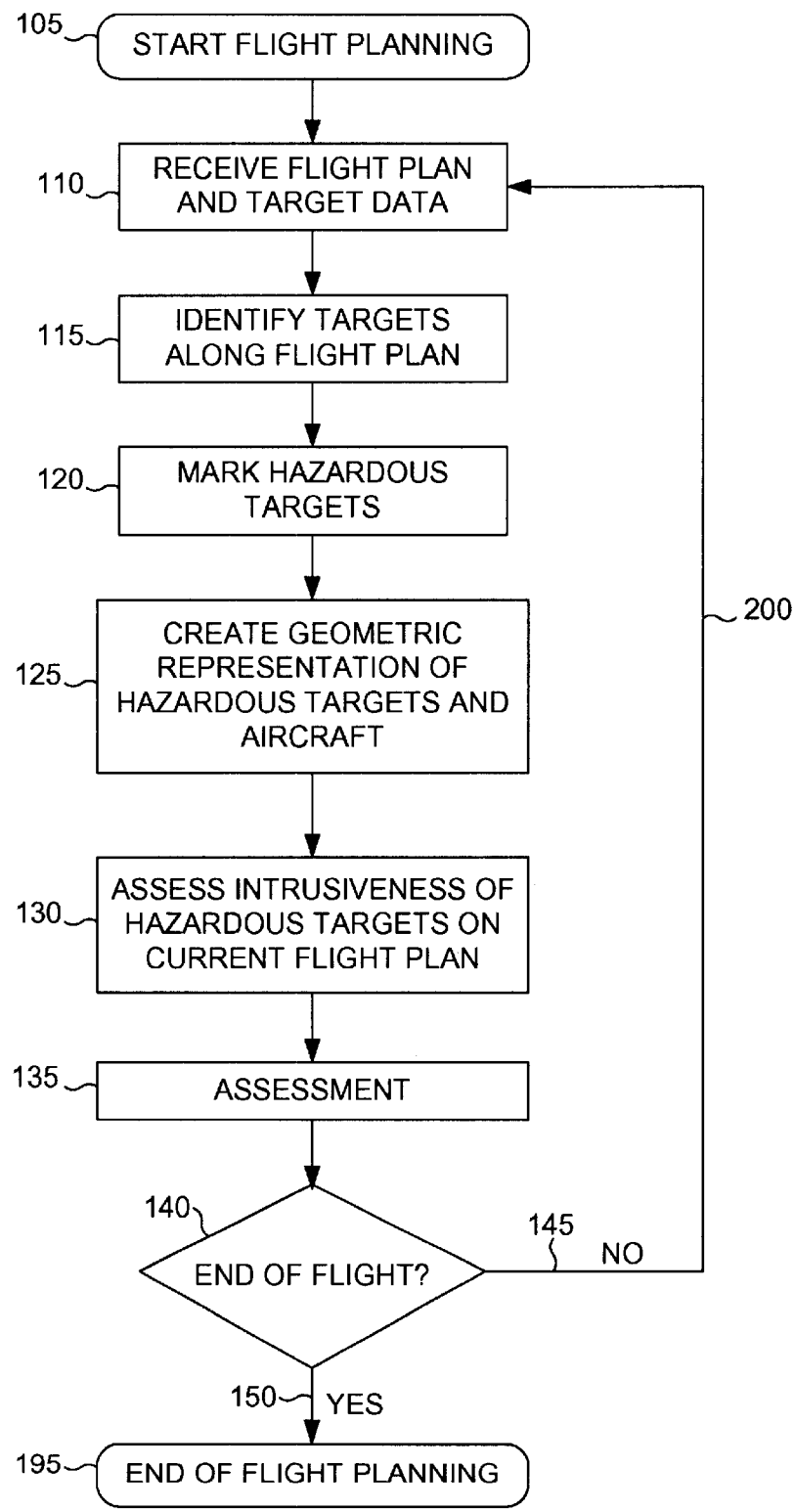
FIG. 1 is a flow diagram depicting one illustrative process for determining the impact of hazardous targets on a travel route plan.

FIG. 1 is a flow diagram depicting one illustrative process for determining the impact of hazardous targets on a travel route plan. In this case, a travel route plan is the anticipated route a vehicle will travel in order to arrive at its destination safely. A travel path for a given vehicle is the actual route traveled by the vehicle and is only known, with certainty, after the trip is complete. Travel route planning begins before the beginning of a trip (step 105) and finishes at the end of the trip (step 195).

Travel route planning may be an ongoing activity during the course of a trip due to changing and unpredictable conditions along the intended travel route. Therefore, a typical travel route planning session generally consists of several iterations 200 of receiving travel route plan information, planning, receiving more information and then re-planning. For instance, travelers proceeding along a given travel route plan may receive information about disruptive weather from vehicles traveling ahead of them, but along the same travel route plan. Upon receiving this information, a traveler may re-plan their flight in order to avoid the disruptive whether. For the purposes of this discussion, a traveler may be a pilot, a mariner, a submariner, an astronaut or any other individual responsible for navigating or piloting a non-constrained vehicle.

According to one illustrative method for assessing hazards along a travel route plan, travel route plans and target data may be received (step 110). Once this information is received, it may be used to identify targets along the travel route plan (step 115). Once targets are identified as being along the travel route plan, they may be evaluated to determine if they are hazardous (step 120). In some cases, the method of the present invention may not perform any additional processing for targets that are either not along the travel route plan or that are determined not to be hazardous. Accordingly, the method of the present invention provides that each hazardous target that is found along the travel route plan should be represented geometrically. Also, the method of the present invention provides that the vehicle also be represented geometrically (step 125).

After geometric representations are either created or received from external sources for the hazardous targets and the vehicle, the method of the present invention provides for an assessment of intrusiveness of the hazardous targets into the travel route plan intended to be traversed by the vehicle (step 130). The results of this assessment may then be made available to a traveler or to other equipment either on, or off-board the vehicle (step 135).

Travel route information typically comes from navigation personnel entering information such as trip origin, destination, speed and waypoints. In some embodiments, waypoints may be represented in either two or three dimensions. In some cases, this information comes from onboard equipment.

Figure 2:
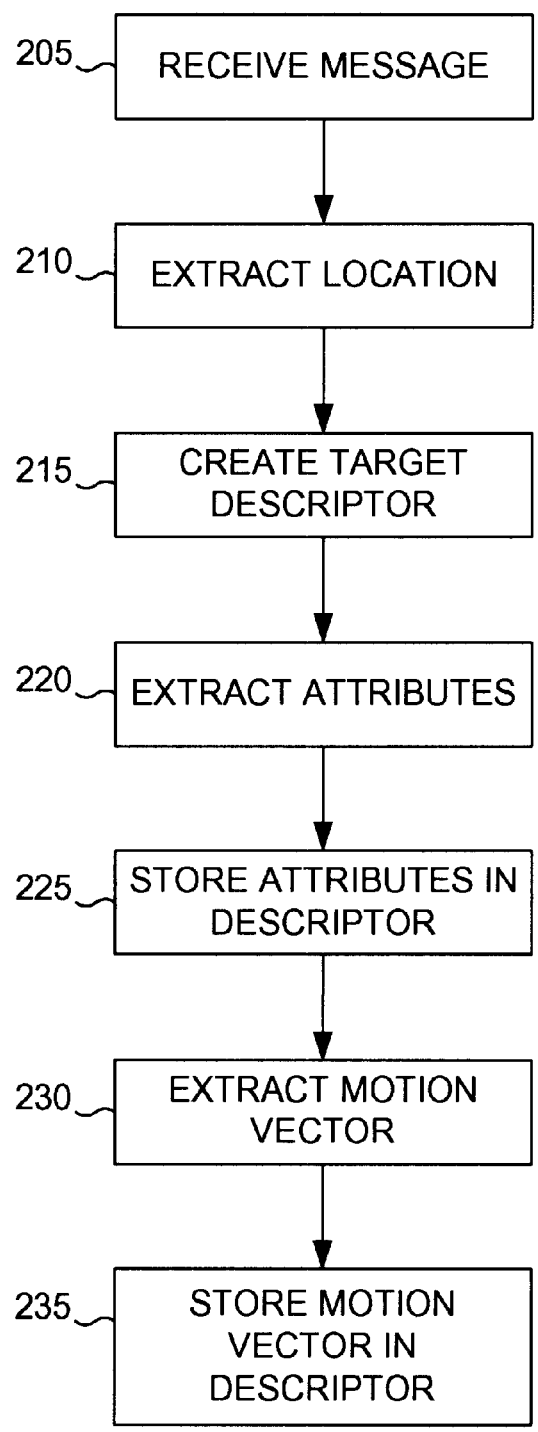
FIG. 2 is a flow diagram that depicts one illustrative method for processing target messages according to the present invention.

FIG. 2 is a flow diagram that depicts one illustrative method for processing target messages according to the present invention. In this example embodiment of the present invention, target data is received (step 205) as messages during a planning session from any number of sources including but not limited to satellite systems, on and off-board radar systems, terrestrial target tracking systems, or other vehicles. Target data may comprise information about weather hazards, other vehicles, or terrestrial hazards such as tall mountain ranges or man-made structures. In the case of space travel, targets may be man-made satellites, space debris or micrometeorites.

Each target message may comprise a location for the target. This location is typically extracted from the target message (step 210) and stored in a newly created target descriptor (step 215). In all alternative embodiments of the present method, the location specified in the target message may be transformed into a vehicle relative location or into a global coordinate location. In some embodiments, target messages may comprise attributes that describe key characteristics of a particular target. Such attributes may include, but may not necessarily be limited to a type indicator that may indicate the type of target described by the target message. Typical types may include "storm", "lightning", "767-aircraft", "sailing vessel" and the like. This enumeration is intended for illustrative purposes only and is not intended to limit the scope of the present invention. These attributes may also be extracted from the target message (step 220) and subsequently stored in a target descriptor (step 225).

In some embodiments of a method according to the present invention, the target message may further comprise a motion vector for the target. In this case, the illustrative method of the present invention provides for extraction of the motion vector (step 230) and storage of the motion vector in the descriptor (step 235).

Travel route plan messages may also be received according to one illustrative method of the present invention. Travel route plan messages may comprise an origin for a particular trip and its destination. The travel route plan messages may further comprise waypoints along the intended path. Travel route plan messages may also comprise speed indicators representative of the intended travel speed between waypoints. In yet another alternative method of the present invention, travel route plan messages may also comprise check times the indicate the time a vehicle intends to initiate the journey and the time at which the vehicle intends to achieve any intermediate waypoints and the final destination for the trip. According to another embodiment of this illustrative method, target messages may also be received for the vehicle itself. These target messages may indicate the current position of the vehicle along the travel route plan.

Figure 2A:
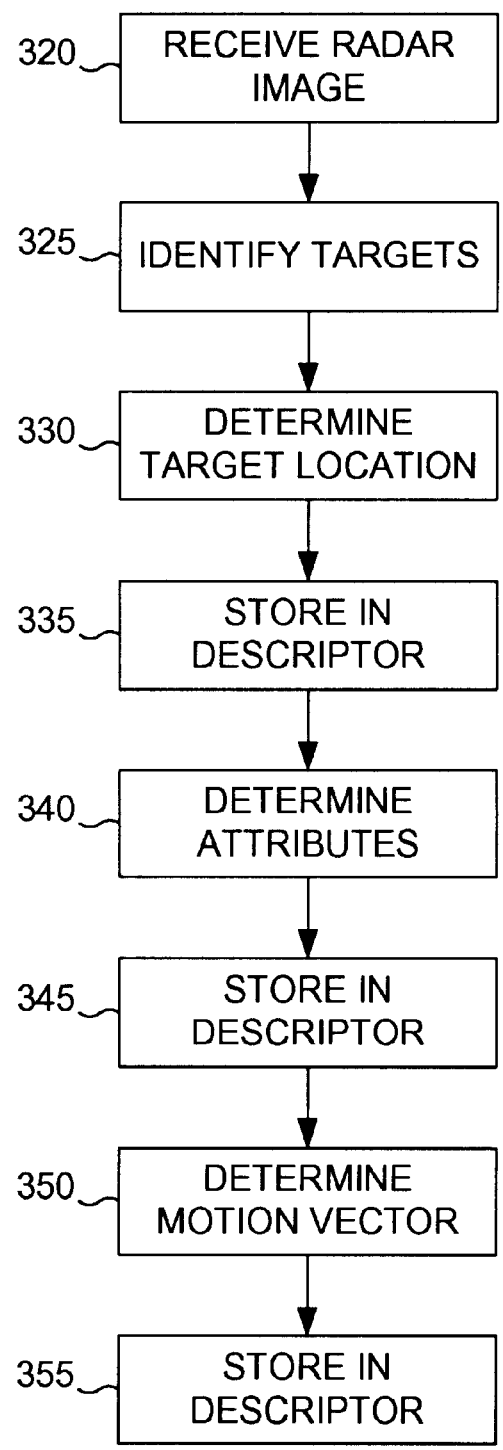
FIG. 2A is a flow diagram that depicts one illustrative method for processing radar images from a radar system disposed on a traveling vehicle.

FIG. 2A is a flow diagram that depicts one illustrative method for processing radar images from a radar system disposed on a traveling vehicle. According to this illustrative example, a radar image is first received (step 320). In some embodiments of the method of the present invention, the radar image may comprise a plurality of azimuth traces each of which may be represented by a plurality of digital values corresponding to increasing distance from the radar unit. Each of these digital values typically represents the strength of reflection of radar energy at a particular distance. This radar image is typically subjected to a scanning method in order to identify targets within the image (step 325).

According to one example embodiment of the method according to the present invention, the location of a target (step 330) may then be used to create a target descriptor (step 335). In some embodiments of this method, additional processing may be performed upon the radar image to identify certain attributes of a target. In one example method, the reflectivity and size of a target may be used to determine if the target is a weather condition or another vehicle such as an aircraft or ship. This type of attribute information may be determined (step 340) and stored in the targets corresponding target descriptor (step 345). In yet another example method, the radar image may be utilized to track a target in order to determine a motion vector for that target (step 350). The motion vector may then be stored in the target descriptor (step 355). In yet another alternative embodiments of the present invention, the method provides for the generation of a geometric representation for a target based on the image data received from the radar.

According to one illustrative embodiment of the method of the present invention, weather cell reports may be received and target descriptors may be generated in response to these weather cell reports. In one typical embodiment, the target descriptor may define the position of a weather cell as described in the weather cell report. In yet another illustrative embodiment of the present method, weather cell attributes may be extracted from the weather cell report and stored in the target descriptor. In yet another illustrative embodiment of the present method, a motion vectors may be extracted from the weather cell report and stored in the target descriptor corresponding to the weather cell.

In some embodiments of a method according to the present invention, target messages may be created for stationary targets. Stationary targets typically comprise high elevation terrain and tall man-made structures. In marine applications, stationary targets may comprise oil-rig platforms, barges, reefs and small islands. This list of stationary targets is intended for illustrative purposes only and is not to limit the scope of the present invention. In one illustrative method of the present invention, stationary targets may be defined by position and other attributes in an electronic map. An entry in the electronic map may be used to create a target descriptor for these types of stationary targets. According to one method of the present invention, an electronic map may be received from a source external to the vehicle or it may be retrieved from some form of electronic readable media.

Figure 3:
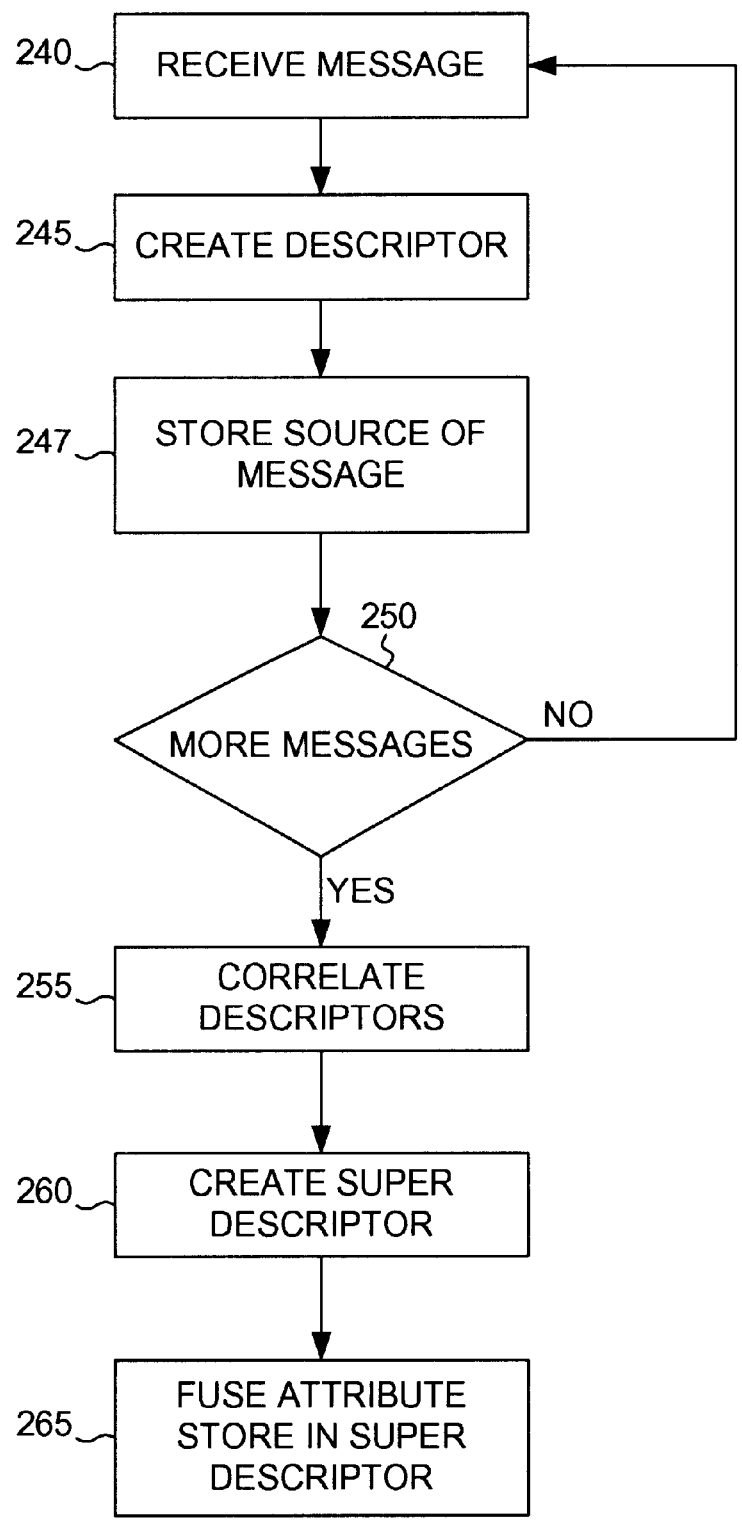
FIG. 3 is a flow diagram that depicts one illustrative method for fusing target descriptors according to the present invention.

FIG. 3 is a flow diagram that depicts one illustrative method for fusing target descriptors according to the present invention. In some cases, information can be received about the same target from, different sources. In one illustrative method, messages are received (step 240) for some processing interval. A target descriptor is created for each message (step 245). Creation of target descriptor typically comprises extraction of a location, attributes, and other information such as a motion vector from a target message and storage of this information in the target descriptor. So long as the processing interval has not expired and there are more messages (step 250) additional messages may be received and target descriptors created.

Some sources are known to be more accurate and their data may be utilized in favor of target data from other sources, or all of the information may be fused into an aggregated data record about the same target. In some embodiments, aggregated data may also be classified according to confidence level to reflect the accuracy of the original source of the data. This type of confidence and target source information may be associated with particular target descriptors as their created in response to each message received (step 250).

Once target descriptors are accumulated through a processing interval, they may be correlated (step 255). This correlation process results in identifying target descriptors that may represents the same target. Typically, this is accomplished by comparing the location of a target as reflected in a location element of the target descriptor. The target descriptors may not need to have an exact match of their location elements. In some embodiments of this method, a tolerance level may be applied to the location elements of each target descriptor as all of the target descriptors are correlated.

After the correlation process is complete and if duplicate target messages are discovered, the method of the present invention provides for the creation of a super descriptor (step 260). All of the attribute data from the set of duplicate descriptors may then be combined and stored in the super descriptor (step 265). The duplicate target may be eliminated, but this is an entirely optional step.

Figure 4:
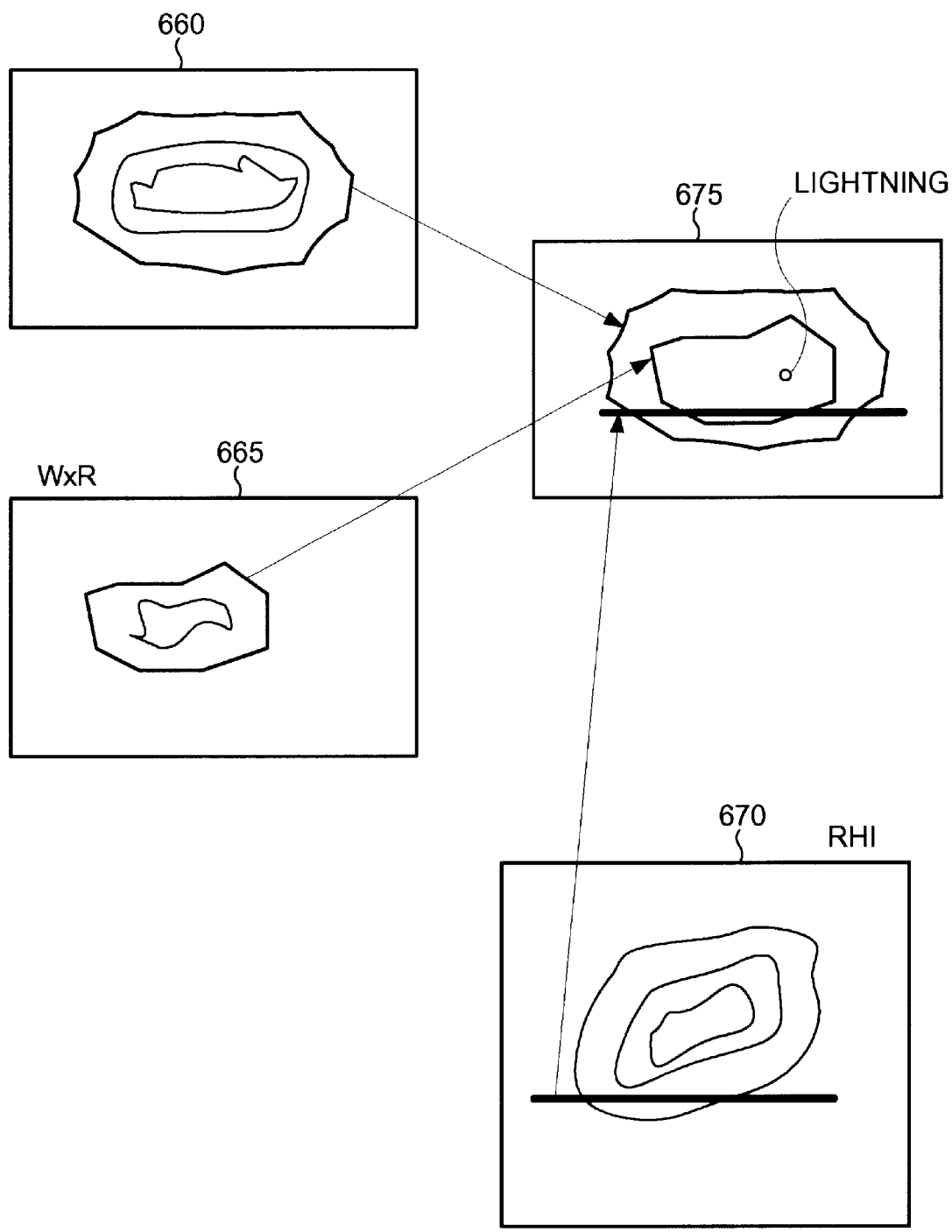
FIG. 4 is a pictorial representation of one illustrative method for fusing target attributes according to the present invention.

FIG. 4 is a pictorial representation of one illustrative method for fusing target attributes according to the present invention. Target descriptors are typically generated from a plurality of target messages. Many target messages comprise attributes that describe the character of the target, Many target messages comprise a geometric shape descriptor. In one embodiment of the present method, target data derived onboard the vehicle 805 may be fused into a single descriptor 820. The onboard target message shown in the figure depicts the target as having a first geometric representation in the form of a polygon. In the illustrative example set forth in the figure, weather radar from the ground may also provide a target descriptor that comprises a geometric representation 810 in the form of a second polygon. Yet another ground based target message may also refer to the same target as a weather front 815 that is geometrically represented by a line. The fused, or super target descriptor may carry all of the geometric representations from all of the individual target messages. According to this figure, a target message representing a lighting event may be represented by a point. This, too, may, be fused into the super descriptor.

Figure 4A:
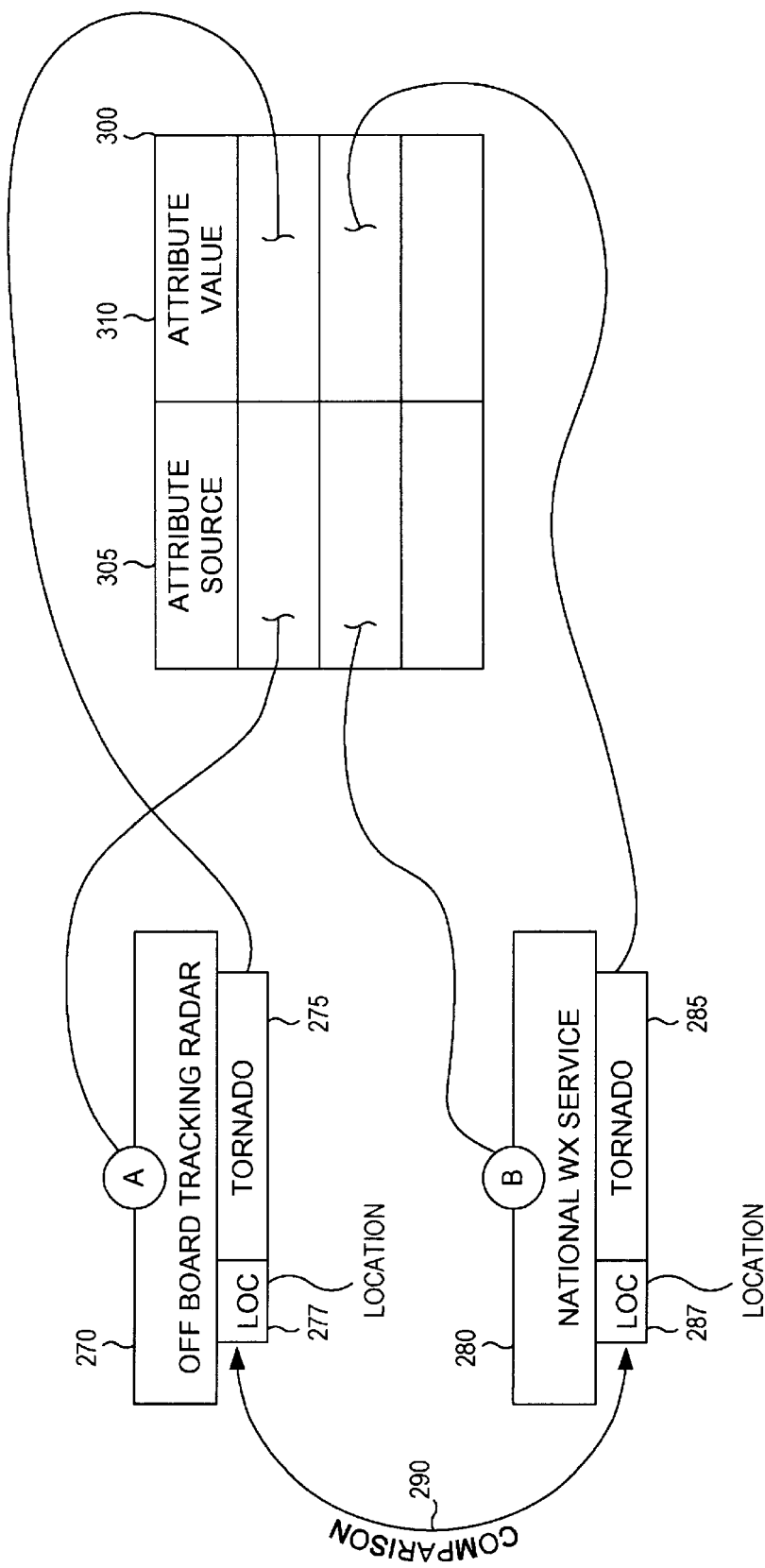
FIG. 4A is a pictorial representation of an attribute fusing process according to one illustrative method of the present invention.

FIG. 4A is a pictorial representation of an attribute fusing process according to one illustrative method of the present invention. A super descriptor may also comprise information regarding the source of attributes stored therein. For instance, where an attribute was fused into the super descriptor from a target descriptor originally created in response to a target message received from an off-board target tracking system, the super descriptor may comprise an identifier associated with the attribute that correspondence to the off-board target tracking system. According to this illustrative example, a first target descriptor 275 may have been created in response to a target message received from a first off-board tracking system 270. A second target descriptor 285 may have been created in response to a target message received from a second off-board tracking system 280. In this illustration, which should not be used to limit the scope of the present invention, the first off-board tracking system 270 may be a ground-based radar system whereas the second off-board tracking system 280 may be the National Weather Service.

During correlation, the location elements of the target descriptors 277 and 287 may be compared 290. If this correlation indicates that the two target descriptors 275 and 285 referred to the same target, their attributes may be fused into a super descriptor 300. The super descriptor 300 typically comprises an attribute source field 305 and an attribute field 310. A source identifier corresponding to the source of a target message that resulted in the creation of the first and second target descriptors in this example would be stored in the attribute source field 305. The actual value of the attribute from each target descriptor 275 and 285 may then be stored in the attribute value field 310 comprising the super descriptor 300.

Other information from the target descriptors 275 and 285 may also be fused in this manner and stored in the super descriptor 300. In one example of embodiments of a method of the present invention, the location element of the each target descriptor fused in this manner may also be stored in this super descriptor 300. Any geometric representation of the target that may comprise the target descriptors may also be fused into the super descriptor 300 in this manner.

Figure 5:
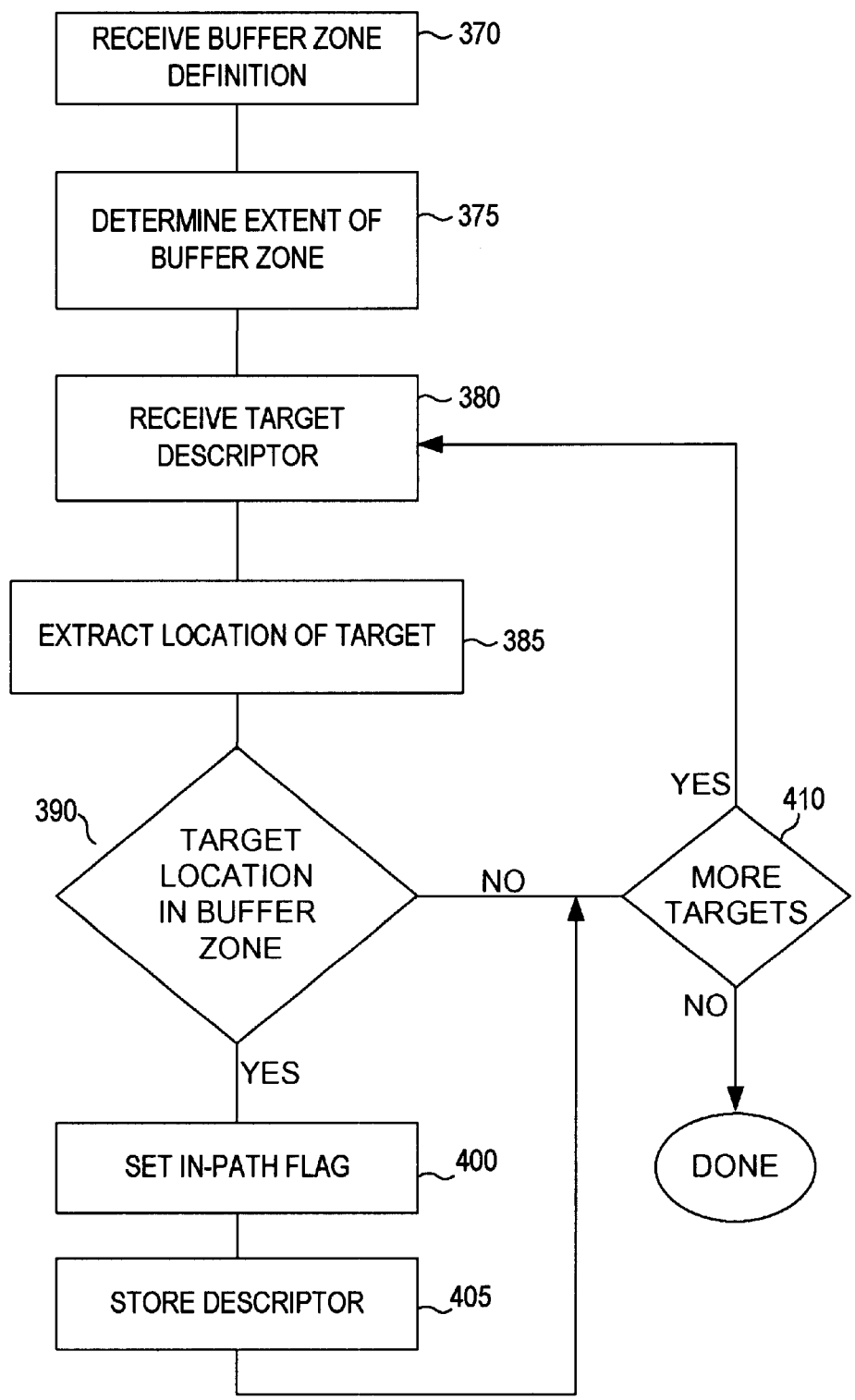
FIG. 5 is a flow diagram that depicts one example method for determining if a target is situated along the travel route plan of a vehicle.

FIG. 5 is a flow diagram that depicts one example method for determining if a target is situated along the travel route plan of a vehicle. In the travel route planning process, it may not be necessary to consider the status of targets that will not be encountered by the vehicle in question. This may be accomplished by specifying a buffer zone along the intended travel route. A user may specify the buffer zone, or it may be predefined and stored in computer readable media.

The buffer zone definition may also be received from an external source (step 370). In some cases, the buffer zone may be expanded to encompass all targets that may be visible to a traveler on a vehicle (i.e. the buffer zone is the entire universe). The extent of the buffer zone must first be determined (step 375). This may be accomplished by establishing a perimeter or volume representation of the zone. To determine if a target is within the buffer zone, it's position is typically evaluated and compared against the extents of the buffer zone. To do so, the method of the present invention teaches that a target descriptor be received (step 380) and a location for the target extracted there from (step 385). If the target is found to be within the perimeter or volume of the buffer zone (step 390), its corresponding target descriptor is marked as such (step 400) and stored (step 405). If a target is not within the buffer zone, it may be marked as "no-process" to indicate that no further consideration of that target is necessary. In an alternative embodiment of this method, the target descriptor may be referenced in a list of active targets. Each target descriptor is evaluated in a like manner (step 410).

Figure 6:
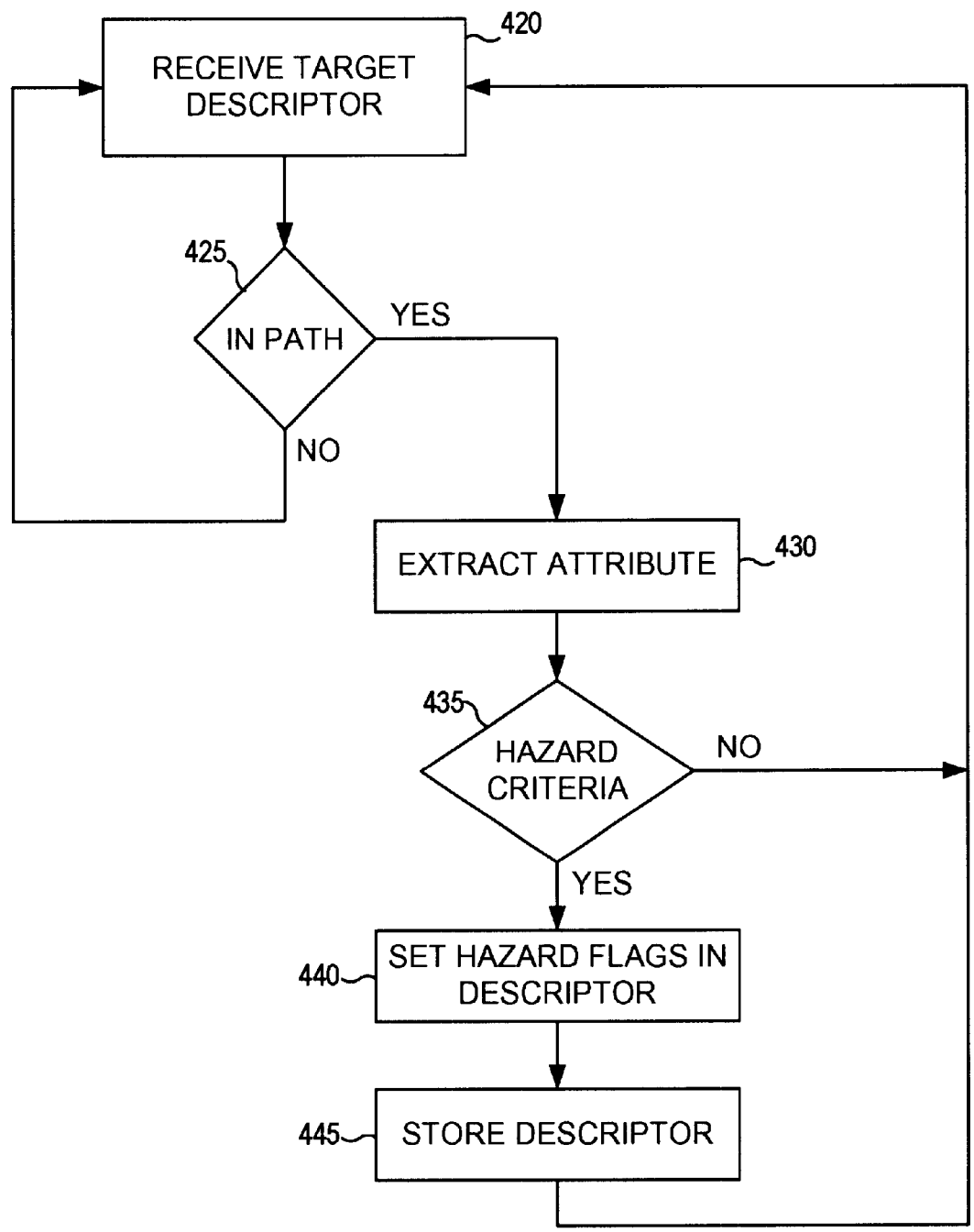
FIG. 6 is a flow diagram that depicts one example method for determining the threat level of a target.

FIG. 6 is a flow diagram that depicts one example method for determining the threat level of a target. After a target descriptor has been received (step 420) and individual targets have been identified as being along the travel route plan (step 425), the targets are evaluated to determine if they are hazardous. If they are determined to be hazardous, the target's corresponding target descriptor may be marked. In one example embodiment of the present invention, a single logic bit comprising the target descriptor may be set to "one" if the target is determined to be hazardous. Non-hazardous targets would then be indicated by a logic bit value of "zero". In some cases, the target may be determined to be hazardous prior to examination and the hazard logic bit may already be set to a value of one. This may occur when the target message corresponding to the target inherently indicates that the target is hazardous. For instance, when a target message is received for a tornado, that message may already carry an active hazard flag. This is but one example of a target that may be inferred as being hazardous based on the target message itself.

The criteria for determining whether to set the hazard logic bit to one or zero may vary for each target. In addition, the hazard evaluation criteria may vary according to other criteria not related to the target itself. For instance, some storms may be less hazardous to some types of aircraft and therefore the target data record representing that storm may not be altered to flag it as a hazard. In these cases, the step of marking targets as hazardous may be optional.

As target messages arrive, they may carry attributes that describe certain properties of the target. These attributes are typically extracted from the message and then stored in the corresponding target descriptor. In order to determine if a target is hazardous, one illustrative method according to the present invention retrieves an attribute from the target descriptor (step 430) and compares that to a predefined list of hazardous items (step 435). If the retrieved attribute matches an entry in the enumeration of hazard types, a flag may be set in the target descriptor (step 440) to indicate that the target is hazardous. The descriptor may then be stored (step 445). Some example hazard types may include hazardous weather, terrestrial fixtures and high elevation terrain. This illustrative list is not intended to limit the scope of the present invention. In yet another embodiment of a method according to the present invention, a list of hazardous targets may be created and maintained. In this alternative illustrative method, the target descriptor for a target having been determined to be hazardous is referenced in the hazardous target list.

One or more target attributes may be used in alternative methods of hazard identification. In one such alternative method, a Bayesion network may be used to determine if a target is hazardous. In yet another alternative embodiment, the method of the present invention may comprise a causal network to determine if a target is hazardous. Rule-based expert systems and case-based reasoning strategies may also comprise the method of the present invention and may be configured to recognize hazardous targets.

In one alternative method of the present invention, the severity of threat exhibited him by a hazardous target may also be ascertained from particular attributes comprising a target descriptor corresponding to the target. For instance, a weather cell target may comprise a wind speed attribute. Again, this is only an illustrative example of one particular attribute that may be used to infer a level of threat and should not be used to limit the scope of the present invention. In yet another alternative method of the present invention, the confidence factor may be established for a particular target the indicates the confidence that may be attributed to a particular hazard assessment. In one illustrative example that should not be used to limit the scope of the present invention, a target descriptor representing a weather cell report received from the National Weather Service may be believed to a greater level of certainty than a faint radar returned indicating a thunderstorm.

Figure 7:
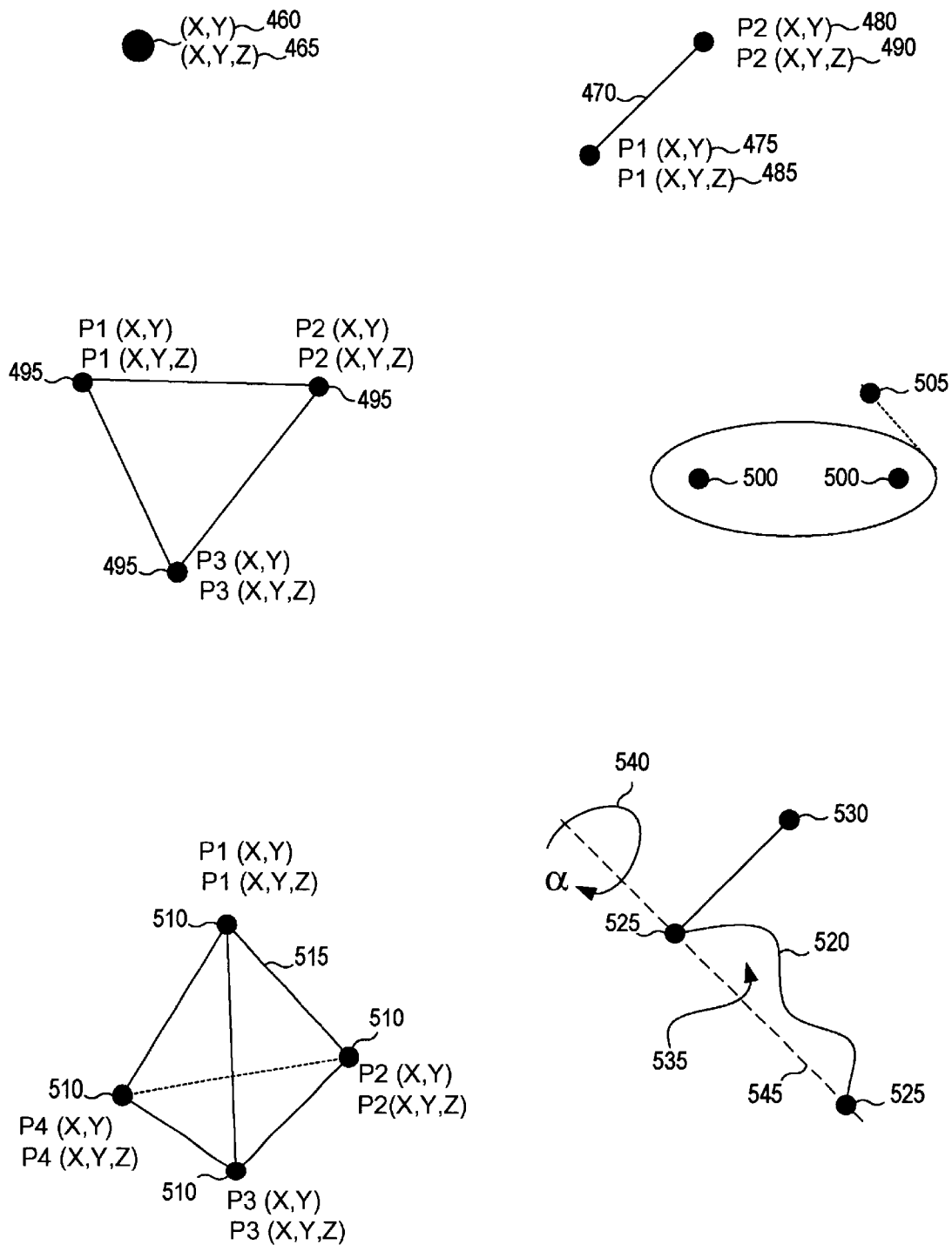
FIG. 7 is a pictorial diagram that depicts various illustrative methods for geometrically representing a traveling vehicle or a target.

FIG. 7 is a pictorial diagram that depicts various illustrative methods for geometrically representing a traveling vehicle or a target. In one example embodiment of the present method, geometric representations of the vehicle and a target may be generated or received from an external source. In each individual case, the geometric representation envelops the target or vehicle in a fashion that creates a region around the specified object. For the case of a vehicle, the surrounding zone is referred to as a confidence zone (CZ). The region around a target should is typically referred to as an avoidance zone (AZ). It is typical for the perimeter of the CZ to be 20 nautical miles or more from the center of the vehicle. Therefore, if the CZ of vehicle and the AZ of the target are just touching each other the objects are actually 40 nautical miles apart. The size and shape of a CZ or AZ may vary according to confidence in the position of the vehicle and to the target type, respectively. Variation in the size and shape of either the CZ or AZ is not intended to limit the scope of the present invention.

In one example embodiment of the present invention, the characteristics of the CZ may comprise one or more data fields of a travel route plan or they may be predefined for a particular type of vehicle. When the CZ of a vehicle is defined by the travel route plan, different geometric representations for the vehicle may be specified for different portions of the travel route plan. Target descriptors may comprise definitions of the target's AZ. In some embodiments, the geometric representation of a target AZ may comprise the target message received and that originally specified the location of the target.

The geometry of either the CZ or the AZ may be represented by a point, line, ellipse, polygon, or other abstract shape. These may be represented in either two or three-dimensional space. According to one illustrative method of the present invention, a point may comprise a geometric representation. This point may be either in two or three-dimensional space (460,465). Likewise, a geometry may be represented by a line 470 defined in two or three dimensions by two end points (475 and 480 or 485 and 490). A portion of a plane may also be used to geometrically represent a CZ or an AZ. Typically, the plane may be represented in either two or three-dimensional space by at least three points 495. According to one illustrative method, a portion of a plane may also be represented by the perimeter of an ellipse. Accordingly, an ellipse may be specified in either two or three-dimensional space by identifying two points 500 corresponding to the focal points of the ellipse and at least one point 505 that controls the focal length of one or both focal points.

In some embodiments of the present method, the geometric representation of a CZ or an AZ may define a volume. In one alternative method, a volume may be specified by at least four points 510 in three-dimensional space. This allows representation of a volume having linear sides 515. An abstractly shaped volume may be specified by first specifying a Bézier curve 520. This may be accomplished by specifying two end points 525 for the curve and at least one point 530 that controls the curvature 535 of the Bézier curve as it approaches one of the end points. The Bézier curve may then be rotated through a sweep angle 540 about a straight axis 545 running through its two end points.

It is important to note that the method of the present invention provides for receiving or creating a geometric representation of hazardous targets. In some situations, the geometric representation received by way of a target message may be used as the AZ for a target. In other embodiments of the inventive method introduced here, the geometric representation received through a target message may be altered in accordance with other attributes that describe a target. One such example, which is not intended to limit the scope of the present invention, is to expand the AZ forward of a moving target. Hence, the motion vector of a moving target may be used to deform the original geometric representation received through a target message. In one example method, the AZ is made smaller on the tail end of a weather cell while, but it may be expanded in the direction that the weather cell is traveling.

Another example method for creating geometric representations of a target, i.e. an AZ provides that the type of target be considered when resizing the geometric representation of an AZ. One such example is that of expanding an AZ for excessively turbulent weather cell such as thunder or lightning storms. This example is not intended to limit the scope of the present invention.

Figure 8:
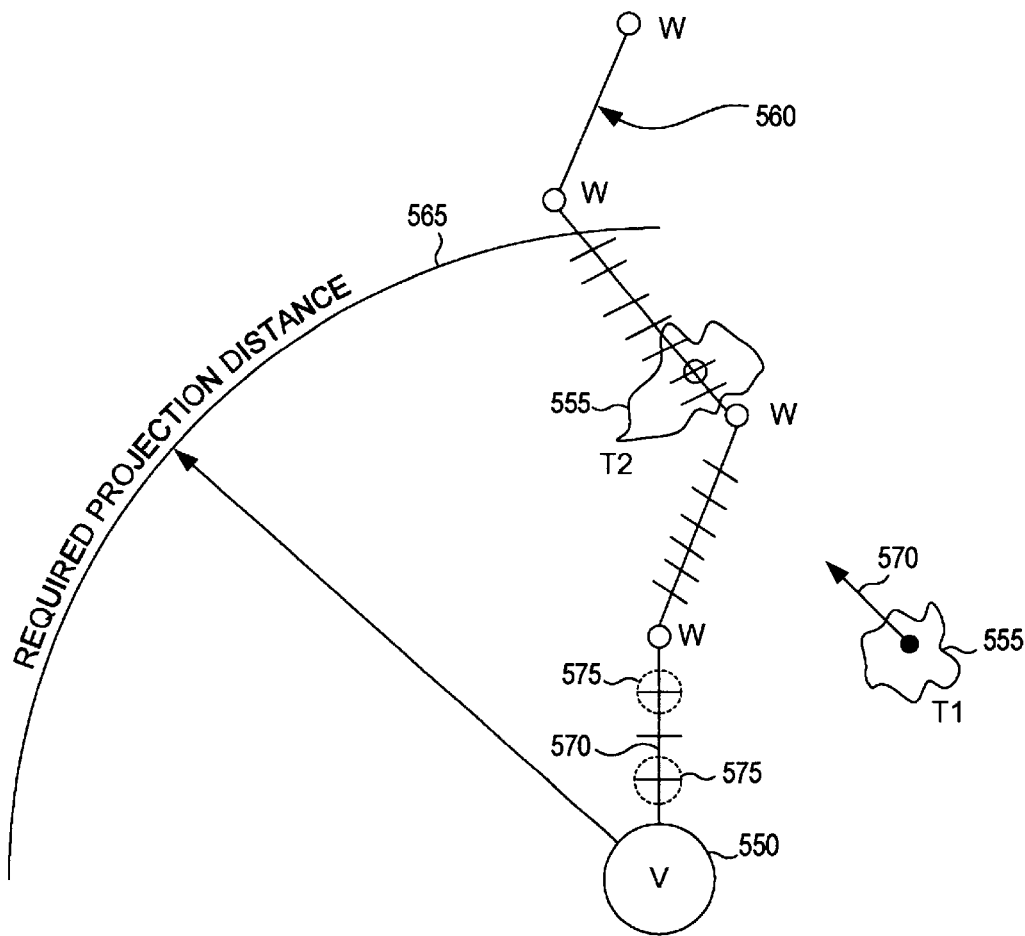
FIG. 8 is a pictorial representation of one illustrative method for determining intrusiveness of a target into a travel route plan of a vehicle.

FIG. 8 is a pictorial representation of one illustrative method for determining intrusiveness of a target into a travel route plan of a vehicle. After the CZ 550 has been generated or received for the vehicle and an AZ 555 has been established for each identified hazardous target, the present invention assesses the intrusiveness of each hazardous target on the current travel route plan 560. In one example embodiment of the present invention, the assessment entails determining whether the hazardous target AZ will encroach upon the vehicle's CZ during the course of the travel route plan.

According to one example method of the present invention, intrusiveness of a hazardous target may be accomplished by first determining the amount of travel projection 565, in either time or distance, that must performed for the vehicle. In this illustrative method, the amount of projection may be partitioned into a plurality of increments 570. For each increment, the geometric representation of the vehicle may be projected 575 in time or distance to the end of the increment. The extent or volume of the projected geometric representation of the vehicle may then be compared against a static geometric representation of a target 555. If any static geometric representation of a target 555 is found to overlap the projected geometric representation of the vehicle, the segment of the travel route plan corresponding to the increment 570 where the overlap exists may be marked as being a hazardous segment of the travel route plan.

And one alternative embodiment of the method of the present invention, the geometric representation of a target 555 may be projected in time or distance according to a motion vector 570 corresponding to the target. In some embodiments, the motion vector may be retrieved from a target descriptor corresponding to the target. The amount of projection of a target is likewise segregated into increments and the projection is evaluated at the end of each increment akin to the evaluation made for the projected geometric representation of a vehicle discussed immediately supra. The intrusiveness assessment is referred to as a dynamic assessment of intrusiveness when the targets are projected in time or distance and results in segments of the travel route plan being marked hazardous when an overlap between the projected geometric representation of the vehicle and the projected geometric representation of a target is predicted.

After the intrusiveness of each hazardous target is assessed, the method of the present invention calls for providing the assessment to a traveler or to other equipment disposed on or off-board the vehicle. One method for providing the assessment of either static or dynamic intrusiveness provides for conveying a list of segments of a travel route plan to have been marked as hazardous according to the teachings of the present invention. Yet another illustrative method of the present invention allows for display of the current travel route plan along with a visual representation of the intrusiveness of hazardous targets. The travel route plan assessment display comprises the vehicle, the path of it travel route plan, the identified hazardous targets, their estimated travel route plan impact, and locations at relevant flight times. In some embodiments, the travel route plan assessment display may further comprise standard map symbols indicating distance, location and other flight attributes.

In order to present a traveler with a meaningful situation display, one illustrative method of the present invention provides for partitioning the path of a travel route plan into a finite number of segments. The path of the travel route plan the then be presented by displaying each of the segments to the traveler. In the case for a particular segment has been marked as hazardous according to the teachings of the present invention, the displayed segment may be highlighted. Highlighting of a hazardous segment on the display may comprise painting a line parallel to and offset from the segment to be highlighted. Highlighting of a hazardous segment on the display may also comprise painting two lines parallel to and straddling the segment to be highlighted. Highlighting may also be accomplished by causing the segments to be highlighted to flash or to be painted in a distinct color that may be different than the color used to display other segments of the path comprising the travel route plan. These example methods for highlighting a segment are provided here for illustrative purposes only and should not be used to limit the scope of the present invention.

In yet another alternative method for highlighting a hazardous segment on the display, other distinctive highlighting schemes may be used to indicate the severity of threat associated with a particular segment of the travel route plan presented to a traveler. Likewise, yet another distinctive highlighting schemes may be used to indicate the level of confidence that may be given to any particular hazardous assessment. In a typical embodiment of this method, attributes from a particular target descriptor may be used to assign threat severity and confidence of prediction to a particular segment of the travel route plan being evaluated. This evaluation may take place either during static or dynamic intrusiveness assessments and may be presented to the traveler through a corresponding method for presenting the results of the assessments.

Figure 9:
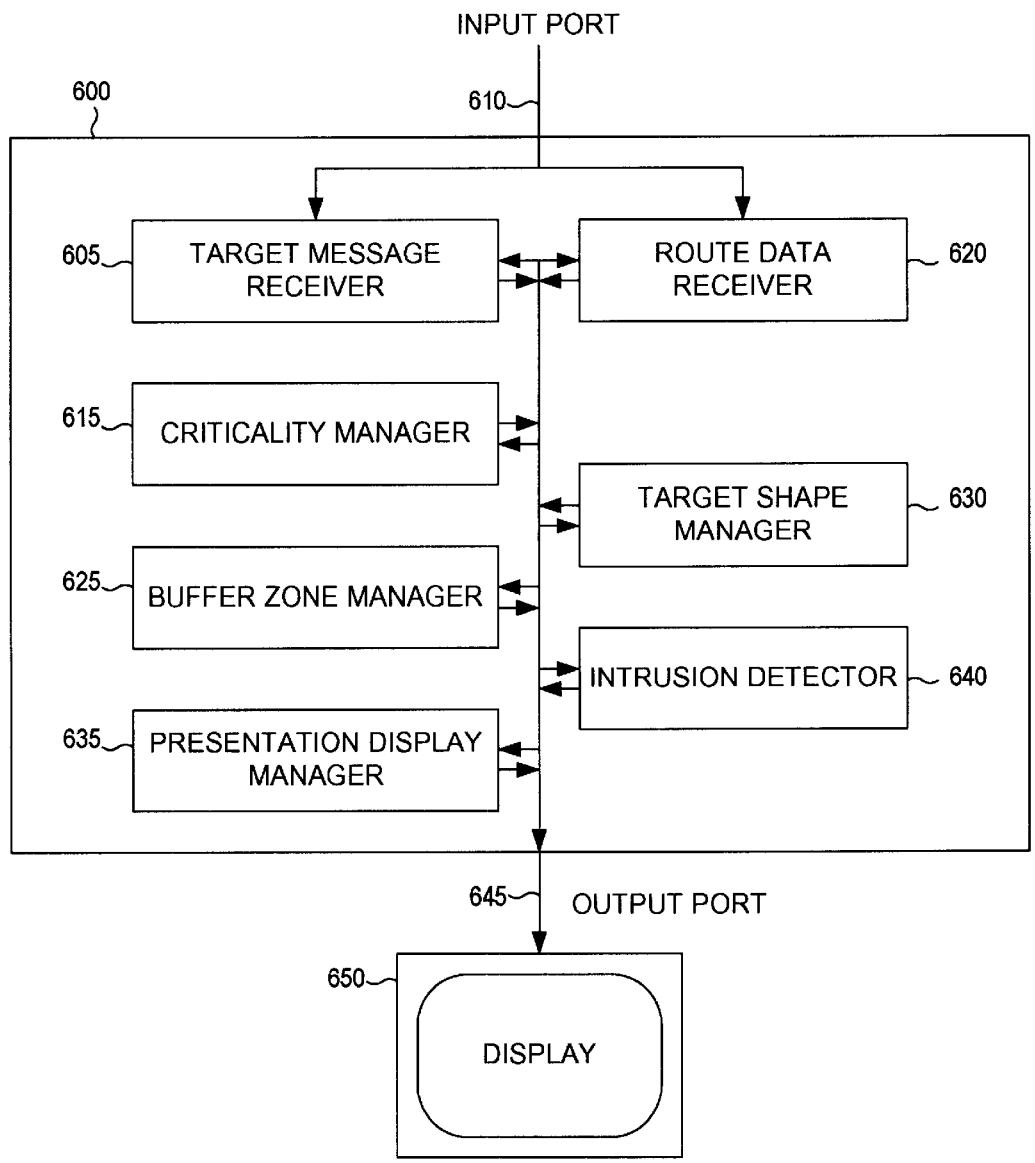
FIG. 9 is a block diagram that depicts a travel route hazard identification, assessment and display device according to one example embodiment of the present invention.

FIG. 9 is a block diagram that depicts a travel route hazard identification, assessment and display device according to one example embodiment of the present invention. The device comprises a target message receiver 605 and a route data receiver 620 that are coupled to an input port 610. In this example embodiment, the target message receiver 605 and the route data receiver 620 may interact with a criticality manager 615, a target shape manager 630, a buffer zone manager 625, an intrusion detector 640 and a presentation manager 635 that further comprise the device 600. The identification and assessment device 600 receives, at a minimum, route data and target information from one or more input ports 610. Travel route data may include but is not limited to, travel route plan and vehicle status information such as speed, altitude, and heading. In many cases, vehicle status information may arrive as a special target message and may be processed akin to any other target message received by the device 600. Incoming data at port 610 may arrive from any number of sources such as, but not limited to, on-board radar and sensor systems, global satellite systems, other vehicles, and terrestrially based systems. This list is presented for illustrative purposes only and is not intended to limit the scope of the present invention.

The buffer zone manager 625 may receive a buffer zone definition that defines the extent or volume of a buffer zone along a travel route received from the route data receiver 620. The buffer zone manager 625 may further mark target message it receives from the target message receiver 605 that represent targets located within the extent or volume of the buffer zone as requiring hazard and intrusion assessment.

The criticality manger 615 may identify targets as hazardous based on predetermined and/or dynamically determined criteria. In this example embodiment of the present invention, the criticality manager 615 analyzes target records from the target message receiver 605 that have been marked as requiring hazard and intrusion assessment by the buffer zone manager 62. Furthermore, the criticality manager 615 may determine whether a target is hazardous based on information from the target message. For example, the criticality manager 615 may determine that a target is hazardous if the target record associates precipitation with the target and a relevant data record from the route data receiver indicates freezing temperatures at the current altitude. This illustrative example is not intended to limit the scope of the present invention. The criticality manager 615 may also determine the hazardousness of a target by comparing a target attribute, which may be found in a target record, to a predefined list of hazard types. After determining that a target is hazardous, the criticality manger 615 may mark the target as hazardous by setting a logic bit in a one field in a corresponding target data record to a value of "one".

The target shape manager 630 creates a geometric representation for a target having a corresponding target record marked as hazardous according to the teachings of the present invention. The target shape manager may receive one or more predefined geometric representation specifications and may be requested to create one or more geometric representations for a specified target represented by a target record. The generated or received geometric representation may be in accordance with the teachings of the method of the present invention. The target shape manager 635 may also store the necessary geometric representation information directly in the target data record.

The intrusion detector 640 marks as hazardous, segments of a specified travel route plan based on the intrusion of relevant targets according to the teachings of the present invention. In this example embodiment of the present invention, the intrusion detector 640 has a coordinating function and relationship with the criticality manager 615, target shape manager 630, and buffer zone manger 625. At predefined and/or user-definable intervals, the intrusion detector 640 may request or receive travel route plan information from the route data receiver 620, and detect possible target intrusions at the present time and location or at some future time and location defined by the travel route plan it receives.

Upon receiving a request or self-initiating an intrusion detection session, the intrusion detector 640 requests travel route data from the route data receiver 620. A target record from the target message receiver 605 may then be evaluated by the buffer zone manager 625 to determine if the target is within a predefined buffer zone along the travel route. The criticality manager 615 then determines if the target is hazardous and, if so, requests a geometric representation of the target from the target shape manager 630. The intrusion detector 640 may set a logical bit in a travel route path data record to a value of "one" to represent that a target is intrusive and hazardous or "zero" if the target is not hazardous and/or intrusive.

The presentation display manager 635 controls the display of target and travel route plan information in this example embodiment of the present invention. The display of any target or travel route plan information is user definable and can be updated anytime. The presentation display manager 635 may coordinate with other logical components (e.g. criticality manager 615, target shape manager 630, buffer zone manager 625 and intrusion detector 640) to acquire relevant information to display. The presentation display manger 635 also interfaces with the display apparatus to present the relevant travel route data and target information.

In one example operation of the present invention, the presentation display manager 635 may receive a travel route plan from the route data receiver 620. Subsequently, it will request target records for all targets relevant to the specified travel route plan. The presentation display manager 635 may then display the current travel route plan and target information by sending appropriate display commands to a display device 650 through the output port 645. The presentation manager 635 may add enhancements to the display of information relating to the attributes of the identified hazardous targets according to the teachings of the current invention. For example, the presentation manager 635 may highlight areas where the current travel route plan and hazardous targets occupy the same space. The presentation manager 635 may also display valuable control and symbolic information such as, operating instructions for the present invention, aircraft status, and text messages relating to the assessment of the current flight plan.

The display device 650 may or may not comprise the present invention. The display device 650 displays travel route plan and target information under the control of the presentation manger 635. The display control commands arrive at the display 635 from the identification and assessment device 600 output port 645. According to the teachings of the current invention, the display device 650 is minimally capable of displaying geometric objects in a requested color, highlighting and blinking state.

Figure 10:
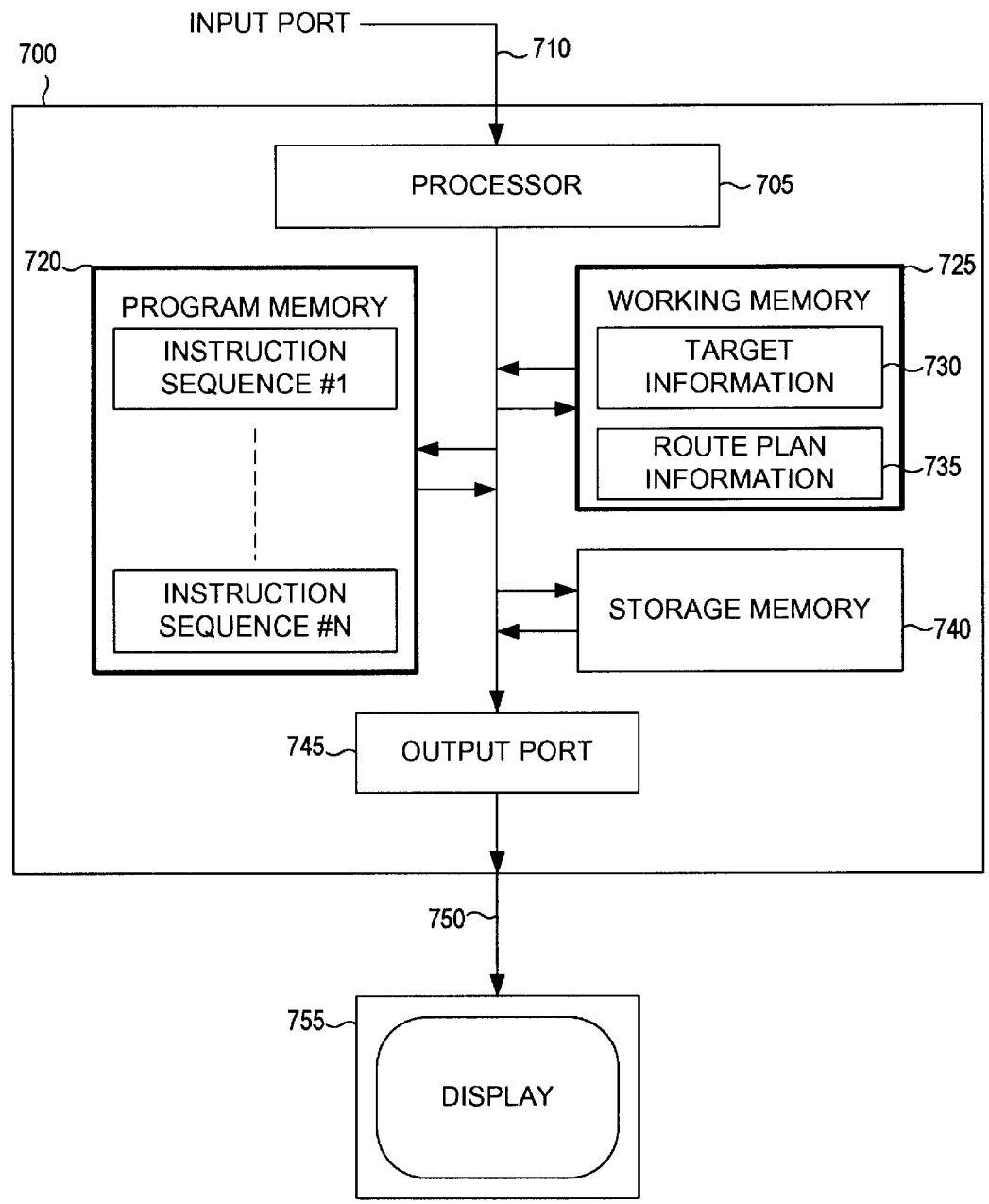
FIG. 10 is a block diagram that depicts a travel route hazard assessment device according to one example embodiment of the present invention.

FIG. 10 is a block diagram that depicts a travel route hazard assessment device according to one example embodiment of the present invention. The device 700 comprises a processor 705 coupled to an input port 710. In this example embodiment, the processor 705 may interact with program memory 720, working memory 725, storage memory 740, and an output port 745. In some embodiments of the device 700, the output port 745 may drive a display adaptor 760 that may further comprise the device 700. The identification and assessment device 700 receives, at a minimum, travel route data and target information from one or more input ports 710. Travel route data may comprise a travel route plan. Vehicle status information such as speed, altitude, and heading, may be received as a target message. Incoming data at port 710 may arrive from any number of sources such as, but not limited to, on-board radar and sensor systems, global satellite systems, other aircraft, and terrestrially based systems. In addition, the identification and assessment device 700 may receive control and configuration information to influence the operation of the device according to the teachings of the present invention. The identification and. assessment device 700 facilitates the display of travel route plan and hazard assessment information at the display 755 coupled to the output port 745 according to the teachings of the present invention.

The processor 705 is the main controlling component of the identification and assessment device 700. According to this example embodiment of the present invention, it receives, organizes and processes target and travel route plan information from the input port 710, identifies hazardous targets, assesses their impact on the travel route plan and provides this assessment to external devices. One such device may be the display device 755 that may further comprise the invention. According to the teachings of the present invention, the processor 705 minimally analyzes the target and travel route plan information, creates buffer zone, AZ and CZ geometric representations and estimates whether a the geometric representations of a target (AZ) will overlap in time or space with the specified geometric representation of a vehicle (CZ).

The program memory 720, comprising the travel route hazard assessment device 700 of the present invention, provides storage and random access to one or more processor instruction sequences that the processor 705 may execute. The instruction sequences stored in the program memory cause the processor to execute operations according to the teachings of the present invention. The program memory 330 may provide storage for the instruction sequences while power is not applied to the device 700. It may also allow instruction sequences to be added and deleted under control of the processor 705 during general operation, self-test or configuration modes. The program memory 720 interfaces directly with the processor 705 in this example embodiment of the present invention.

The working memory 725, comprising the travel route hazard assessment device 700 of the example embodiment, provides random access storage for target 730 and travel route plan 735 information used by the processor 705. In some example embodiments, the working memory 725 may also provide storage for and access to a processor stack memory and other variable data that may be required to support execution of the methods taught here. Working memory 340, in this example embodiment of the present invention, may retain all information when power is not available.

Figure 11A:
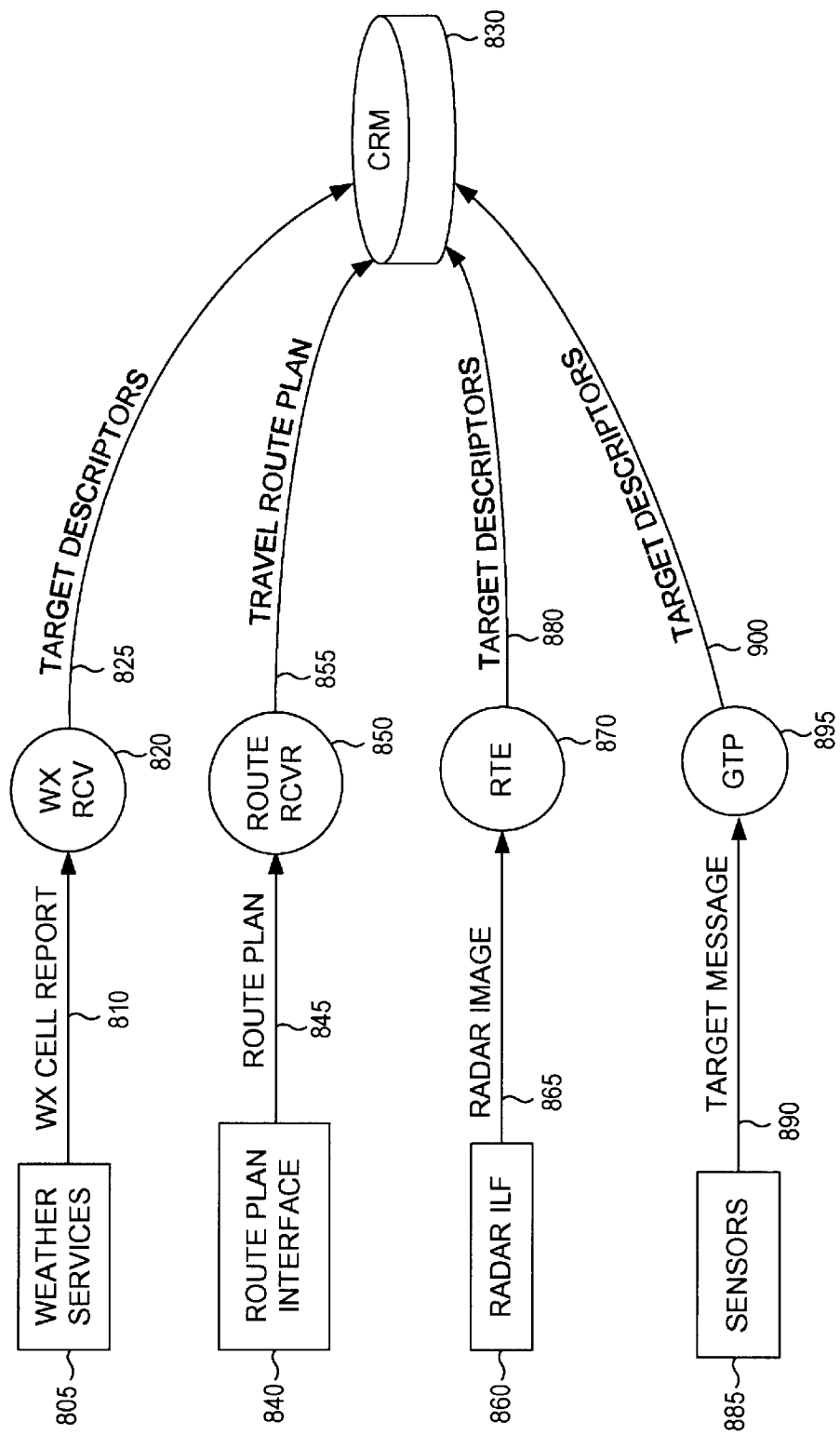
FIG. 11 is a data flow diagram that depicts interactivity of instruction sequences stored in the program memory according to one illustrative embodiment of a travel route hazard assessment device.
Figure 11B:
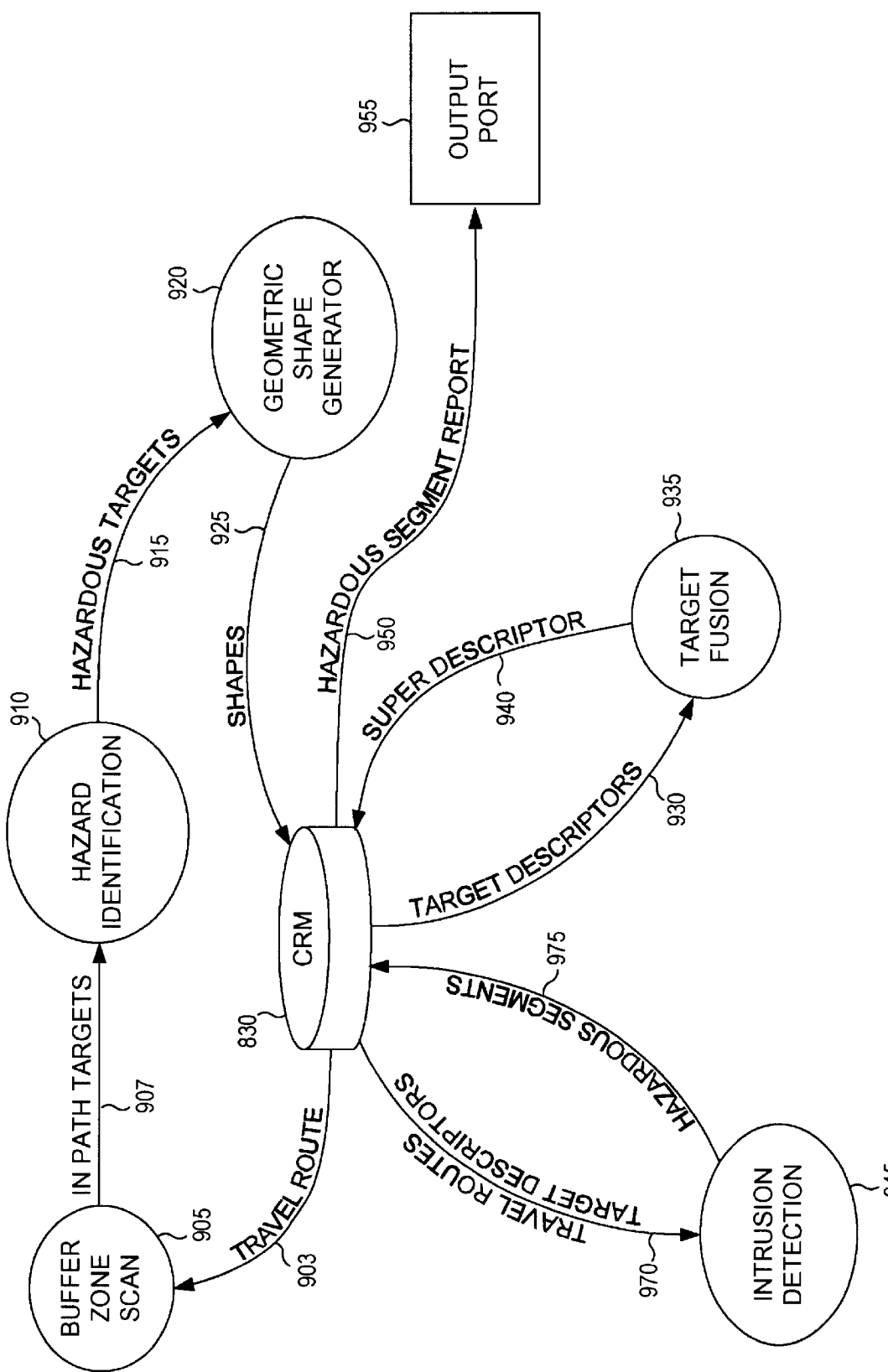

FIG. 11 is a data flow diagram that depicts interactivity of instruction sequences stored in the program memory according to one illustrative embodiment of a travel route hazard assessment device. The travel route hazard assessment device may further comprise a travel route hazard assessment instruction sequences that may be stored in program memory. This instruction sequences may cause the processor to receive a target message from the input port 710. The processor will typically store a target position extracted from the target message in working memory. This is normally stored in a target descriptor. This instruction sequences a further cause the processor to receive a travel route plan for a vehicle from the input port 710 store this in the working memory 725. In a typical embodiment, the processor may create or receive a geometric representation of a vehicle to store this in the working memory as well.

After a target is received into the working memory 725, the processor may determine the if that target lies within a buffer zone along the travel route plan that has been stored in working memory. If a target descriptor stored in the working memory 725 represents a target that lies within the buffer zone, that target descriptor may be marked as lying in the path of the vehicle. The processor may then determine if a target descriptor that has been marked to indicate that the target it represents lies in the path of the vehicle is actually hazardous. If that target is found to be hazardous, the processor may create or receive a geometric representation of the hazardous target and store this in the working memory 725. For a hazardous target, the processor will periodically assess if the geometric representation of the hazardous target intrudes upon the geometric representation of the vehicle stored in the working memory. Typically, the geometric representation of the vehicle stored in working memory is projected along the travel route plan that is also stored in working memory 725. The travel route hazard assessment instruction sequences 800 may also causes the processor to provide the assessment of intrusion to the output port 745.

In one illustrative embodiment of the present invention, the program memory 720 may also be used to store a radar target extraction instruction sequence 870 that may further comprise the invention. The radar target instruction sequence 870 typically accepts radar images 865 from a radar interface 860. According to the method of the present invention, the radar target instruction sequence 870 identifies a target within the image and creates target descriptor for the target. Also in accord with the teachings of the present method, the radar target instruction sequence 870 will store the position of the target in the target descriptor in either a vehicle relative form or relative to a global coordinate system. It should be noted that the target descriptor may be stored in the working memory 725 or any other computer readable media 830. The radar target extractor instruction sequence 870 may also create target attributes for and identify target and store these in the target descriptor that may be stored in working memory 725.

The travel route hazard assessment device of the present invention may also accept target messages 890 from external sensors 885. The processor 705 may accomplish this by executing a general target processing instruction sequence 895. The general target processing instruction sequence comprising the present invention is typically stored in the program memory 720. The general target processing instruction sequence 895 minimally causes the processor to receive target messages from various tracking systems. These target messages typically define the position of a target that the processor uses to create target descriptors that define the position of a target relative to the vehicle or relative to global coordinate system. The processor may then store the target descriptor in working memory 725. In one alternative example embodiment of the present invention, the general target processing instruction sequence 895 may also cause the processor to extract target attribute data from the target message in store this extracted target data in the target descriptor stored in the working memory 725. The general target processing instruction sequence 895 may also cause the processor to extract a target motion vector from the target message in store this in the target descriptor stored in working memory 725.

In one alternative embodiment of for the travel route hazard assessment device, a whether target receiver instruction sequence 820 may be stored in program memory 720 and may further comprise the present invention. The weather target receiver instruction sequence is typically executed by the processor 705 in order to receive whether cell reports from external whether services 805. These weather cell reports typically define the position of whether cell which the processor uses to create target descriptors in the working memory 725. These target descriptors may comprise a position indicator for the weather cell that defines the position of the weather cell either relative to the vehicle or relative to a global coordinate system.

Some embodiments of the present invention may comprise a route plan interface 840 typically embodied as an input port 710. Route plans 845 may be received and processed by a route receiver instruction sequence 850. The route receiver instruction sequence 850 may also excepted vehicle status from the route plan interface 840. In one embodiment of the present invention the route receiver instruction sequence 850 may create target descriptors that represent current vehicle status and store those in the working memory 725, i.e. computer readable media 830. The route receiver instruction sequence 850 typically creates travel route plan information and stores this in the working memory 725.

According to one illustrative embodiment of the present invention, a travel route hazard assessment device may further comprise a target fusion instruction sequence 935 stored in program memory 720. In some cases, target messages may be received from different sources that referred to the same target. In this situation, the teachings of the method of the present invention require a fusion of the duplicate target descriptors that results from these messages. Hence, the processor 705 may receive a target message from the input port 710 by executing the target fusion instruction sequence 935.

The target fusion instruction sequence 935 may cause the processor to receive a plurality of target messages from the input port and extract the position in attribute data from these target messages into create a plurality of target descriptors corresponding to the plurality of target messages received. The processor 705 may then correlate the resulting target descriptors in order to identify a set of target descriptors that may refer to the same target. The attribute data from each of the target descriptors in this identified set may then be used into a single super descriptor that may then be stored in working memory 725. According to the teachings of the method of the present invention, other information in the individual target descriptors including, but not necessarily limited to location, motion vectors and geometric representations of a target may all defused into the super descriptor in this manner.

Once the working memory. 725 has accepted various target descriptors in travel route plan information, the processor may determine which targets lie within a buffer zone along the travel route plan by executing a buffer zone scan instruction sequence that may further comprise the invention. The buffer zone scan instruction sequence 905 typically receive this travel route information and target descriptors 903 from a computer readable media 830 that may comprise the working memory 725. The buffer zone scan instruction sequence 905 typically causes the processor to except a buffer zone a definition from a user or to retrieve a buffer zone definition from the working memory 725 according to the teachings of the method of the present invention. This buffer zone definition may be retrieved from any suitable computer readable media 830. The processor may then determine the extent or volume of the buffer's own along the travel route plan retrieved from computer readable media 830. It should be noted that the working memory 725 is but one form of computer readable media 830 that may be used by the processor to store and retrieve information.

The buffer zone scan instruction sequence 905 may marked target descriptors stored in computer readable memory 830 to indicate if the target represented by the target descriptor lies within the buffer zone. Likewise, it may marked a target descriptor with a "no-process" indicator. This will a preclude any additional processing for targets that are not within the buffer zone along the travel route plan for the vehicle. In some embodiments of the present invention, the buffer zone scan instruction sequence 905 may pass along the target descriptors that lie in the path of the vehicle 907 to a hazard identification instruction sequence 910 that may further comprise the invention and may be stored in the program memory 720.

When executed by the processor as a means for determining if a target is hazardous, the hazard identification instruction sequence 910 may cause the processor to retrieve a target descriptor from working memory or to receive a target descriptor from the buffer zone scan instruction sequence 905. In either case, the hazard identification instruction sequence may extract the first attribute from the target descriptor and compare the value of that attribute to a list of predefined hazard types. If the attribute matches an entry in the list of predefined hazard types, the hazard identification instruction sequence 910 will set a hazard flag comprising the target descriptor which it may then store in working memory 725. The hazard identification instruction sequence 910 may also pass target descriptors for hazardous targets to a geometric representation instruction sequence 920 that may further comprise the invention and may be stored in the program memory 720.

The geometric representation instruction sequence 920 may be executed by the processor 705 in order to create a geometric representation of a hazardous target. The geometric representation instruction sequence 920 may cause the processor to store a point in order to represent a target has a point in either two or three-dimensional space. This point is typically stored in the target descriptor stored in working memory 725, i.e. computer readable media 830. The geometric representation instruction sequence 925 may also cause the processor to store in the target descriptor for a target two points representing a line in either two or three-dimensional space. Alternatively, the geometric representation instruction sequence 925 may also cause the processor to represent a target has a portion of a plane in either two or three-dimensional space by storing three or more points in the target descriptors corresponding to the target and stored in working memory 725.

The geometric representation instruction sequence 925 may also cause the processor to represent a target has a portion of a plane to find by the perimeter of an ellipse in either two or three-dimensional space. According to one illustrative embodiments of this invention, the processor 705 may define the ellipse by specifying at least two points representing in the focal points of the ellipse and at least one point to control the focal length of either one or both of the focal points.

According to yet another illustrative embodiments of the travel route hazard assessment device, the geometric representation instruction sequence 925 may cause the processor to represent a target as a three-dimensional volume having linear boundaries by specifying at least four points in three dimensional space and storing these four points in the target descriptor corresponding to the target stored in working memory 725.

Another novel method that the geometric representation instruction sequence 925 may cause the processor to employee in representing a target may cause the processor to specify two end points of a Bézier curve and at least one point to control the curvature of the Bézier curve as it approaches one of the end points. The geometric representation instruction sequence 925 may then cause the processor to revolve the Bézier curve through a predefined sweep angle about a straight access running through the end points of the Bézier curve.

According to one illustrative embodiments of the present invention, an intrusion assessment instruction sequence 945 may further comprise the invention and may be stored in the program memory 720. In order to assess intrusion, the processor may periodically execute the intrusion assessment instruction sequence 945 that may cause the processor to determine the extent to which a geometric representation of a vehicle should be projected in time or distance. The amount of projection may then be segregated into a finite number of increments. For each increment, the processor may then project the geometric representation of the vehicle along the travel route plan. If the geometric representation of any target intrudes upon the projected representation of the vehicle to a particular increment, the processor may set a flag in working memory that is associated with a segment of the travel route plan corresponding to the increment of projection.

According to one alternative embodiment of the present invention, the travel route hazard assessment instruction sequence 800 may further cause the processor to determine a motion vector for a target that has been determined to be hazardous. The processor 705 may then periodically assess dynamic intrusiveness of the hazardous target by projecting the geometric representation of the target stored in working memory 725 along the motion vector in time or distance and by projecting the geometric representation of the vehicle along the travel route plan in time or distance. The processor may then determine if the projected geometric representation of the target intrudes upon the projected geometric representation of the vehicle. The processor may then provide the assessment of dynamic intrusion to the output port 745.

According to one illustrative embodiments of the present invention, the travel route hazard assessment device may further comprise a dynamic intrusion instruction sequence.

The dynamic intrusion instruction sequence operates similarly to the normal intrusion instruction sequence except that it may also project the geometric representation of a hazardous target along its motion vector concurrently with the projection of the geometric representation of the vehicle along the vehicle's travel route plan. The dynamic intrusion instruction sequence also segregates a minimum amount of projection in time or distance into a finite number of increments and sets hazard warning flags in working memory for segments of the travel route plan that correspond to an increment where an overlap between the two projected geometric representations is predicted to occur.

Where one embodiment of the present invention conveys the assessment of either static for dynamic intrusion to the output port 745 comprising the travel route hazard assessment device 700, alternative embodiment may comprise a display adapter that is coupled to the output port and a presentation instruction sequence that is stored in program memory. In this alternative embodiment, the processor may provide assessment of intrusion by executing the presentation instruction sequence that causes the processor to partition the travel route stored in the working memory 725 into a plurality of segments and displaying these segments on the display by sending paint commands to the display adapter. For each segments, the processor may retrieve a hazard-warning-flag from working memory 725. For a segment that has an active hazard-warning-flag, the processor may send a highlight command to the display adapter in order to highlight the display of that particular segments. An analogous presentation instruction sequence for presenting dynamic intrusion assessment may also comprise the invention and may be stored in the program memory 720.

In one alternative embodiment of the present invention, the highlight command sent by the processor to the display adapter may comprise a parallel line command wherein the command causes the display adapter to paint a line parallel to an offset from the segment to be highlighted. Highlighting may also be accomplished by sending to line commands to the display adapter in order to paint to parallel line is a straddle the segment to be highlighted. In one alternative embodiment, highlighting is accomplished by sending a flash command to cause the segment to be highlighted to blink on the display. In yet another alternative embodiment, the processor may send a color change commands to the display adapter in order to change the color of the segment to be highlighted to a different color and that used to display not highlighted segments.

The present invention further comprises a method for aggregating target messages. According to this method, target messages may be received from various sources either on or off the vehicle. The messages are first received and target descriptors corresponding to each message comprising position and attribute data carried by the target messages are created. The plurality of target descriptors may then be correlated in order to identify a set of target descriptors that represent the same target. The attribute data from each target descriptor in the identified set may then be aggregated into a single target descriptor.

This method is also embodied in a target aggregator that also comprises the present invention. A target aggregator according to the teachings of the present invention comprises an input port that receives target messages. The target aggregator may also comprise an output port for transmitting fused target descriptors. The processor, program memory and working memory also comprise the target aggregator. The target aggregator may comprise an aggregator instruction sequence stored in the program memory and when executed by the processor causes the processor to receive a plurality of target messages from the input port. The processor may then extract position and attribute data from the plurality of target messages and may create a plurality of target descriptors in working memory comprising this data. Accordingly, the processor may correlate the plurality of target descriptors in order to identify a set of target descriptors that represent the same target. From this set, the processor will collect attribute data in order to create and aggregated target descriptor that comprises a union of all attribute data comprising the target descriptors in the identified set. The aggregated target descriptor may then be conveyed to the output port by the processor.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

The embodiments of a travel route hazard assessment device presented herein refer to a plurality of instruction sequences that are stored in a program memory and that may be executed by a processor. In the true spirit and scope of the present invention, the specific structure of these instruction sequences may be varied to accommodate execution on various hardware platforms in either concentric or distributed fashion. The structure of the memory used to store instruction sequences, program stack and other static or dynamic variables may also be varied according to specific implementation requirements. The type of processor used to execute the methods of the present invention may also be varied together with the structure of the instruction sequences in order to optimize performance. In some example embodiments, the processor may be an array processor or a digital signal processor or a general-purpose processor. The type of processor employed to implement the method of the present invention is not intended to limit the scope of the present invention.

What is claimed is:

1. A method for identifying hazards along an aircraft travel route plan comprising the steps of:

receiving a target message that minimally defines the position of a target;

receiving a travel route plan for a vehicle;

identifying a target along the travel route plan that is within a predefined buffer zone;

marking as hazardous an identified target that meets a hazard condition criteria;

for an identified target marked as hazardous, creating or receiving a geometric representation of that hazardous target;

creating a geometric representation of the vehicle;

periodically assessing intrusiveness of the geometric representation of the hazardous target into the geometric representation of the vehicle by projecting the geometric representation of the vehicle along the travel route plan in time or distance; and providing the assessment of intrusiveness.

2. The method of claim 1 wherein the step of periodically assessing intrusiveness of the geometric representation of a hazardous target into the geometric representation of the vehicle comprises the steps of:
  partitioning the time or distance of required projection into a finite number of increments;
  at each successive increment:
    projecting the geometric representation of the vehicle at the
    increment along the flight plan;
    if the projected geometric representation of the vehicle at that increment is coincident with the geometric representation of the hazardous target, setting a hazard-warning-flag for the segment of the travel route plan corresponding to that increment.

3. The method of claim 1 wherein the step of providing the assessment of intrusiveness comprises the steps of:
  partitioning the travel route plan of a vehicle into a plurality of segments;
  displaying a finite number of segments corresponding to a portion of the travel route plan; and
  for each segment of the portion of the travel route plan displayed, if the state of a hazard-warning-flag comprising a segment descriptor corresponding to said segment is active, highlighting the displayed segment.

4. The method of claim 1 further comprising the steps of:
  determining a motion vector for a target marked as hazardous;
  periodically assessing dynamic intrusiveness of the geometric representation of the hazardous target into the geometric representation of the vehicle by projecting the geometric representation of the vehicle along its travel route plan in time or distance and by projecting the geometric representation of the hazardous target in time and distance along it's motion vector; and
  providing the assessment of dynamic intrusiveness.

5. The method of claim 4 wherein the step of periodically assessing dynamic intrusiveness of the geometric representation of a hazardous target into the geometric representation of the vehicle comprises the steps of:
  partitioning the time or distance of required projection into a finite number of increments; and
  at each successive increment:
    projecting the geometric representation of the vehicle at the increment along the travel route plan;
    projecting the geometric representation of the hazardous target along it's motion vector; and
    if the projected geometric representation of the vehicle at that increment is coincident with the projected geometric representation of the hazardous target at that increment, setting a hazard-warning-flag for the segment of the travel route plan corresponding to that increment.

6. The method of claim 4 wherein the step of providing the assessment of dynamic intrusiveness comprises the steps of:
  partitioning the travel route plan of a vehicle into a plurality of segments;
  displaying a finite number of segments corresponding to a portion of the travel route plan; and
  for each segment of the portion of the travel route plan displayed, if the state of a hazard-warning-flag comprising a segment descriptor corresponding to said segment is active, highlighting the displayed segment.

7. The method of claim of 6 wherein the step of highlighting the displayed, segment comprises the step of painting a line parallel to and offset from the segment to be highlighted.

8. The method of claim of 6 wherein the step of highlighting the displayed segment comprises the step of painting two lines parallel to and straddling the segment to be highlighted.

9. The method of claim of 6 wherein the step of highlighting the displayed segment comprises the step of flashing the displayed segment to be highlighted.

10. The method of claim of 6 wherein the step of highlighting the displayed segment comprises the step of displaying the segment to be highlighted in a color dissimilar to that used to display other segments of the flight plan.

11. The method of claim 1 wherein the step of receiving a target message comprises the steps of:
  receiving a plurality of target messages;
  extracting position data and attribute data from said target messages;
  creating a plurality of target descriptors corresponding to said plurality of target messages comprising the extracted position and attribute data;
  correlating said plurality of target descriptors to identify a set of target descriptors that represent the same target; and
  fusing the attribute data from each target descriptor in the identified set into a single target descriptor comprising a union of attribute data.

12. The method of claim of 1 wherein the step of receiving a target message comprises the steps of:
  receiving a radar image from a radar system on-board the vehicle;
  identifying a target in the radar image; and
  creating a target descriptor for the target that defines the position of the target relative to the vehicle or relative to a global coordinate system.

13. The method of claim of 12 further comprising the steps of:
  generating target attributes for the identified target; and
  storing said attributes into the target descriptor.

14. The method of claim of 12 further comprising the steps of:
  generating a motion vector for the identified target; and
  storing said motion vector into the target descriptor.

15. The method of claim 1 further comprising the steps of:
  receiving a target message from an off-board tracking system that minimally defines the position of a target;
  creating a target descriptor from said target message that defines the position of the target relative to the vehicle or relative to a global coordinate system; and
  if the target message received from the off-board tracking system comprises an attribute, extracting the attribute from the target message received from the off-board tracking system and storing same in the corresponding target descriptor.

16. The method of claim of 1 wherein the step of receiving a target message comprises the steps of:
  receiving a weather cell report that minimally defines the position of a weather cell; and
  creating a target descriptor that defines the position of the weather cell relative to the vehicle or relative to a global coordinate system.

17. The method of claim of 1 wherein the step of identifying targets along the travel route plan that are within a predefined buffer zone comprises the steps of:
  accepting a buffer zone definition from a user or retrieving a buffer zone definition from computer readable media;

determining the perimeter of the buffer zone; and marking a target descriptor as "no-process" if the target descriptor corresponds to a target whose position is outside the perimeter of buffer zone.

18. The method of claim 1 wherein the step of marking as hazardous identified targets comprises the step of:

retrieving a target descriptor from computer readable media;

extracting a first target attribute from said target descriptor; and setting a hazard flag in the target descriptor if said first attribute matches an entry in a predefined hazardous attribute list.

19. A travel route hazard assessment device comprising:

input port that receives a target message and a travel route plan;

buffer zone manager that marks a target message that correspond to a target that is within a predefined buffer zone along said travel route plan;

criticality manager that marks as hazardous a marked target message that corresponds to a target that meets a hazard criteria;

target shape manager that creates or receives a geometric representation for a target having a corresponding target message marked as hazardous;

intrusion detector that periodically determines if the geometric representation of a hazardous target intrudes upon said travel route plan and marks as hazardous segments of said travel route plan that correspond to incidents of such intrusion; and output unit that provides hazardous segment reports for said travel route plan and highlights segments of said travel route plan that are marked as hazardous.

20. A method for fusing target messages comprising the steps of:

receiving a plurality of target messages;

extracting position data and attribute data from said target messages; creating a plurality of target descriptors corresponding to said plurality of target messages comprising the extracted position and attribute data;

correlating said plurality of target descriptors to identify a set of target descriptors that represent the same target; and fusing the attribute data from each target descriptor in the identified set into a single target descriptor comprising a union of attribute data.

* * * * *